United States Patent
Crochet et al.

(10) Patent No.: US 8,725,771 B2
(45) Date of Patent: May 13, 2014

(54) SYSTEMS AND METHODS FOR SEMANTIC SEARCH, CONTENT CORRELATION AND VISUALIZATION

(75) Inventors: Larry Crochet, Orlando, FL (US); Michael Niv, Dayton, MD (US)

(73) Assignee: Orbis Technologies, Inc., Annapolis, MD (US)

( * ) Notice: Subject to any disclaimer, the term of this patent is extended or adjusted under 35 U.S.C. 154(b) by 0 days.

(21) Appl. No.: 13/097,797

(22) Filed: Apr. 29, 2011

(65) Prior Publication Data

US 2011/0270888 A1    Nov. 3, 2011

Related U.S. Application Data

(60) Provisional application No. 61/282,969, filed on Apr. 30, 2010.

(51) Int. Cl.
  *G06F 17/30*   (2006.01)
  *G06F 7/00*    (2006.01)
(52) U.S. Cl.
  USPC .......................................................... 707/790
(58) Field of Classification Search
  None
  See application file for complete search history.

(56) References Cited

U.S. PATENT DOCUMENTS

| | | | |
|---|---|---|---|
| 6,727,927 B1 | 4/2004 | Dempski et al. | |
| 6,820,075 B2 | 11/2004 | Shanahan et al. | |
| 7,574,348 B2 * | 8/2009 | Hon et al. | 704/9 |
| 2002/0087408 A1 | 7/2002 | Burnett | |
| 2003/0028564 A1 * | 2/2003 | Sanfilippo | 707/513 |
| 2006/0036593 A1 | 2/2006 | Dean et al. | |
| 2006/0271526 A1 | 11/2006 | Charnock | |
| 2007/0128899 A1 * | 6/2007 | Mayer | 439/152 |
| 2008/0177994 A1 * | 7/2008 | Mayer | 713/2 |
| 2008/0294624 A1 * | 11/2008 | Kanigsberg et al. | 707/5 |
| 2009/0070326 A1 | 3/2009 | Kraft | |
| 2009/0089277 A1 * | 4/2009 | Cheslow | 707/5 |
| 2009/0132530 A1 * | 5/2009 | Chen et al. | 707/6 |
| 2010/0050131 A1 | 2/2010 | Weise et al. | |
| 2010/0082634 A1 | 4/2010 | Leban | |
| 2010/0191748 A1 | 7/2010 | Martin et al. | |
| 2010/0235353 A1 * | 9/2010 | Warnock et al. | 707/723 |
| 2010/0250578 A1 | 9/2010 | Athsani et al. | |
| 2011/0087686 A1 | 4/2011 | Brewer et al. | |

OTHER PUBLICATIONS

Finkey et al., "Incorporating Non-local Information into Information Extraction Systems by Gibbs Sampling", computer science department, Stanford University, (ACL 2005), pp. 363-370.
Rivest, "The MD5 Message-Digest Algorithm", MIT Laboratory for Computer Science and RSA Data Security, Inc., Apr. 1992, pp. 1-21.
Dean et al., "MapReduce: Simplified Data Processing on Large Clusters", USENIX Association, OSDI '04, 6th Symposium on Operating Systems Design and Implementation, 2008, pp. 137-149.
White, "Hadoop: The Definitive Guide MapReduce for the Cloud—MapReduce for the Cloud", May 2009, 1 page.

* cited by examiner

*Primary Examiner* — Angelica Ruiz
(74) *Attorney, Agent, or Firm* — Rothwell, Figg, Ernst & Manbeck, P.C.

(57) ABSTRACT

Methods and systems for searching over large (i.e., Internet scale) data to discover relevant information artifacts based on similar content and/or relationships are disclosed. Improvements over simple keyword and phrase based searching over internet scale data are shown. Search engines providing accurate and contextually relevant search results are disclosed. Users are enabled to identify related documents and information artifacts and quickly, ascertain, via visualization, which of these documents are original, which are derived (or copied) from a source document or information artifact, and which subset is independently generated (i.e., an original document or information artifact).

33 Claims, 21 Drawing Sheets
(11 of 21 Drawing Sheet(s) Filed in Color)

Semantic Relationships Driven Navigation

Date: Tue, 22 May 2001 06:59:00 -0700 (PDT)
From: bill.williams@enron.com
To: kay.mann@enron.com, dale.rasmussen@enron.com
Subject: RE: turbine torture Kay - I have asked Dale to get with you and Lisa Bills to arrange a meeting in Houston to have a sit down and get this bugger done. I propose Thursday or Friday of next week. The same would go for ABB. Let me know what Dale has arranged, and what you think of the idea. The basic concept is to get in a room for 1-2 hours, and get this document done. I'll let you guys decide on Peter Thompson or whatever is to be used for outside legal.

Regards,

Bill Williams
-----Original Message-----
From: Mann, Kay
Sent: Tuesday, May 22, 2001 11:39 AM
To: Williams, Bill; Rasmussen, Dale
Subject: turbine torture Hi there, I need to get with Lee Johnson on another deal, and I know he will ask about LV CoGen. Anything I should tell him?

Thanks,

Kay

- person
- organization
- location
- date
- calculated information flow
- similar documents

210

220

FIG. 2A key: "name#" + entity_type + " | " + name
one record per type+name pair
attributes are id: list of id's into the entities.txt file, delimited by '\t##id##\t'
    (w/o the apostrophes)
    only original mentions
relationship: list of relationship objects delimited by '##r##'
    for each mention of the type+name
    (across all documents, regardless of sentence duplication)
    for each mention of another type '+name' entity in that sentence
    there is one relationship object in this list
    each relationship object contains the following data elements
    delimited by ##
    key in entities file,
    type1,
    type2
    sentence_id
mention: just like mention in entities.txt:
    one mention for each distinct occurrence of the name+type pair
    across all documents, regardless of sentence duplication
entityLinkScore:
original mentions: list of original mentions of simple entity

FIG. 3D key: msgId |entity_type| name_string
   (one record for each document and each named entity where that named
   entity occurs in at least one original sentence of the document)

value: object with the following attributes
  name: raw text found by extractor
  type:
  mention: space-delimited list of records
    msgID, start_offset, end_offset, sentence_signature, document_size
    (one for each sentence in the current document that
    contains the name+type combo, plus an additional record for
    each copy of that sentence in other documents)
  relationship: list of relationship objects delimited by '##r##'
    one relationship object per entity mention of other entities in
    the same sentence
    each relationship object contains the following data elements
    delimited by '##'
      key in entities file,
      type1,
      type2
      sentence_id

FIG. 3E capacity
provisions of the 1996 rate case, as well as "exacerbate" the primary
firm delivery point
capacity-allocation issues that are pending before FERC now.

The CPUC accused El Paso of "deliberately" filing the Enron contracts at
FERC just
before the holidays to avoid controversy. The pipeline "is trying to
sneak one of the most
controversial things ever past FERC right before Christmas so that
protests would be
minimized," said Morris. "They did this with the Dynegy contracts two
years ago. They

SYSTEMS AND METHODS FOR SEMANTIC SEARCH, CONTENT CORRELATION AND VISUALIZATION

CROSS-REFERENCE TO RELATED APPLICATIONS

The present application claims priority benefit under 35 U.S.C. 119(e) of U.S. Provisional Patent Application No. 61/282,969, entitled "Systems and Methods for Semantic Search, Content Correlation and Visualization," filed Apr. 30, 2011, the contents of which are incorporated herein by reference in their entirety.

BACKGROUND OF THE INVENTION

1. Field of the Invention

The present invention relates to systems and methods for searching a large corpus of data to identify contextually relevant search results, correlating content and visualizing the results.

2. Description of the Related Art

There has been much research on search and retrieval of documents. Typically, searching requires knowledge of a specific term or set of terms. Similarity-based document retrieval allows the user to fetch "more documents like this one" by using a general document-similarity score as measured by counting words without regard to context. However, such search techniques may produce too many false positives and miss too many relevant documents.

BRIEF SUMMARY OF THE INVENTION

Methods and systems for searching over large (i.e., internet scale) data to discover relevant information artifacts based on similar content and/or relationships are disclosed. Improvements over keyword and phrase based searching over internet scale data are shown. Search engines providing accurate and contextually relevant search results are disclosed. Users are enabled to identify related documents and information artifacts and quickly, ascertain, via visualization, which of these documents are original, which are derived (or copied) from a source document or information artifact, and which subset is independently generated (i.e. an original document or information artifact).

Benefits include allowing the user to distinguish a situation in which a single original fact or relationship is repeated many times from one in which several authors independently thinking or operating arrive at the same conclusion.

Application areas include:
Military Intelligence: Enables identification of people and organizations related to a particular person or other entity;
Commercial Applications:
  i. Enables identification of plagiarism across documents, books or other large scale or domain specific datasets,
  ii. Provides for visualization of relationships between artifacts;
Business intelligence: Enables searching and identification of relationships in internet scale data items;
Mining of large scale, poorly curated sources of technical troubleshooting information such as web forums dedicated to technical problems and their solution;
Studying sentiment across multiple social media—identifying thought leaders and how ideas and phrases (sometimes called memes) spread among the public about a company, product, or political matter.

In one embodiment, there is provided a computer-implemented method for identifying relationships between a plurality of documents in a corpus having the steps of parsing document texts into sentences, identifying named entities within the sentences, pairing entities appearing together in the sentences, and assessing or scoring similarity between documents based upon like pairings of entities.

In a second embodiment of the invention, there is provided a computer-implemented method for displaying document relationship information to an analyst having steps of displaying text of a first document from a corpus of documents to the analyst and computing indicators and metrics of the first document's relationships to one or more target documents in the corpus. The indicators may include one or more of (a) an indication of like semantic pairs between the first document and a target document, (b) an indication of the presence of original material in a target document, relative to the first document, for a particular entity and/or semantic pair, and (c) an indication of borrowing direction between the first document and a target document. The metrics may include (i) one or more of measures of the first and a target document sizes, (ii) textual overlap between the first document and a target document, (iii) relationship-overlap between the first document and a target document, and (iv) relationship-overlap between the first document and the relatively unique content of a target document.

In an embodiment, the method includes a step of displaying the metrics and indicators in a tree structure. The tree structure has at least one root node and multiple leaf nodes. Each leaf node identifies a target document and displays one or more metrics and indicators of the target document's relationship with the first document. Non-leaf nodes are defined to group subordinate non-leaf nodes and/or leaf nodes according to one or more of entity type, named entity and semantic pair associated entities. Leaf nodes subordinate to a particular non-leaf node identify those target documents satisfying the criteria indicated by the particular non-leaf node's identity and subordinate position in the tree structure. Optional non-leaf nodes include calculated information flow and similar documents. An additional optional non-leaf node is an "as entity" node, below which appear leaf nodes for target documents having the contextually indicated named entity.

In an embodiment, the analyst may interact with the display. For example, the method may include a step of displaying at least some of the tree structure upon receiving an indication that a selecting indicator, e.g., a mouse pointer, is "hovering" over a named entity in the text of the first document. The method may also include a step of permitting the analyst to select a non-leaf node for expansion or collapse. Upon receiving an indication that the analyst has selected a node for expansion, the method includes a step of displaying subordinate nodes. That is, for example, if the "persons" node is selected for expansion, intermediate nodes subordinate to the "persons" node are displayed, the intermediate nodes relating to names of persons appearing in the first document. The information identifying target documents may be a document name or a file name with optional path or folder identifying information, which altogether may comprise a selectable hyperlink.

In an embodiment, non-leaf nodes of the tree structure may comprise and be labeled by entity type—e.g., persons, organizations, locations, and temporal information. The text of the first document may be displayed such that text related to a particular entity type is displayed in a manner distinct from other text, i.e., different color, highlighting and/or font characteristics. For example, text related to persons may be displayed in a first color, text related to organizations may be displayed in a second color, text related to locations may be displayed in a third color, text related to temporal information may be displayed in fourth color, and other text may be displayed in a fifth color. Entity type labels may be displayed in same distinct manner as that used for distinguishing text related to entity types in the first document.

In another embodiment, there is a computer-implemented method for comparing content overlap between two documents including steps of parsing each document into constituent units such as sentences and computing a hash or digest of each unit. The method further includes steps of comparing the computed hashes or digests of each document and computing proportions of common and distinct contents based on the comparison. In one embodiment, there is also a step of creating a graphic display to indicate the proportions of common and distinct contents. In one embodiment, the graphic display may also provide an indication of document lengths.

In another embodiment, there is a computer-implemented method for comparing relationship overlap between a target document and one or more other documents having the steps of parsing the document texts into units such as sentences, identifying named entities within the units, pairing entities appearing together in the units, and assessing or scoring similarity between the documents based upon like pairings of entities. In an embodiment, a score may be calculated using a Term Frequency-Inverse Document Frequency (TF*IDF) formula, applying the formula to the set of semantic pairs as the TF*IDF universe of terms. In one embodiment, two scores may be calculated: a first score considering all material in a target document and a second score considering only material that is original to the target document. In an embodiment calculating the second score, the method further includes steps of computing a hash or digest of each unit in the documents and comparing the computed hashes or digests of the target document and the one or more other documents in order to identify material original to the target document.

Embodiments of the present invention allow a user to distinguish a scenario where there are potentially many documents derived from an original (and thus hinge on its truth) from a scenario where there might be several independent documents that support a conclusion. Support could come from different evidence, different sources of the evidence, different reasoning, and so on.

In one aspect, the invention provides a system for searching through a corpus by using a search request. The corpus comprises a plurality of items, and the system comprises a server node configured to communicate electronically with a user interface node. The server node is further configured such that when the server node receives a search request from the user interface node, the server node will cause the user interface node to display a list of documents containing an entity named in the search request; determine at least one of a plurality of informational items about the listed documents including one or more of the following items: (a) a degree of relevance to the search request, (b) a date of the information, (c) a portion of the document which is original, and (d) a list of entities related to the named entity; and cause the user interface node to display the list of documents and associated informational items about the listed documents.

In some embodiments, the server node may be further configured such that when the server node receives an indication of a selection of a first document from the listed documents from the user interface node, the server node will compute indicators and metrics of the first document's relationships to at least one target document in the corpus; and cause the user interface node to display the indicators and metrics in a tree structure. The indicators and metrics are selected from the group consisting of (a) an indication of like pairs of named entities between the first document and a target document; (b) an indication of a presence of original material in a target document, relative to the first document, for a particular entity and/or pair of named entities; (c) an indication of borrowing direction between the first document and a target document; (d) a measure of a size of the first document; (e) a measure of a size of a target document; (f) a measure of textual overlap between the first document and a target document; (g) a measure of relationship overlap between the first document and a target document; and (h) a measure of relationship overlap between the first document and a selected portion of a target document. At least one of (f) the measure of textual overlap between the first document and the target document, (g) the measure of relationship overlap between the first document and the target document, and (h) the measure of relationship overlap between the first document and the selected portion of the target document may be displayed as a colored bar having a length corresponding to a magnitude of the respective measure. The indication of borrowing direction between the first document and the target document may be displayed as a horizontal arrow oriented to point in the respective borrowing direction. The indication of the presence of original material in the target document, relative to the first document, for the particular entity and/or pair of named entities may be displayed as a colored bar having a length corresponding to an amount of the original material.

In some embodiments, the displayed tree structure may include at least one root node and a plurality of leaf nodes, wherein each of the plurality of leaf nodes identifies a corresponding target document and at least one indicator relating to a relationship between the corresponding target document and the first document. The displayed tree structure may further include a plurality of non-leaf nodes, each of the plurality of non-leaf nodes being defined according to one of entity type, named entity, and semantic pair associated entity. Each of the plurality of non-leaf nodes may include a group of subordinate nodes, each of the subordinate nodes being either a leaf node or a non-leaf node, wherein each subordinate node in the group corresponding to the respective non-leaf node includes a characteristic corresponding to the definition of the respective non-leaf node.

In some embodiments, the displayed tree structure may further include at least one non-leaf node corresponding to a calculated information flow. The displayed tree structure may further include at least one non-leaf node corresponding to documents having a predetermined minimum measure of similarity. The displayed tree structure may further include at least one non-leaf node corresponding to target document having a predetermined contextually indicated named entity.

In some embodiments, when the user selects a non-leaf node for which the user interface node is not currently displaying the group of subordinate nodes corresponding to the selected non-leaf node, the server node may be further configured to cause the user interface node to expand a display of the selected non-leaf node such that the group of subordinate nodes corresponding to the selected non-leaf node is displayed. When the user selects a non-leaf node for which the user interface node is currently displaying the group of subordinate nodes corresponding to the selected non-leaf node, the server node may be further configured to cause the user interface node to collapse a display of the selected non-leaf node such that the group of subordinate nodes corresponding to the selected non-leaf node is no longer displayed.

In some embodiments, for a particular non-leaf node that is defined by entity type, the server node may be further configured to parse each document included in any of the subordinate nodes within the group corresponding to the particular non-leaf node such that any text relating to an entity type selected from the group consisting of persons, organizations, locations, and temporal information is assigned to a label corresponding to the respective entity type, and to cause the user interface node to display the text such that the assigned label can be visually ascertained by the user. The server node may be further configured to assign a respective color to each respective entity type and to cause the user interface node to display the text according to the assigned color. Alternatively, the server node may be further configured to assign a respective font to each respective entity type and to cause the user interface node to display the text according to the assigned font. As another alternative, the server node may be further configured to assign a respective highlighting characteristic to each respective entity type and to cause the user interface node to display the text according to the assigned highlighting characteristic. When the user selects a first named entity contained within the first document, the server node may be further configured to cause the user interface node to display a section of the tree structure relating to the first named entity.

In another aspect, the invention provides a computer-implemented method for displaying document relationship information to a user. The method comprises the steps of: using a computer to communicate with a user interface node; receiving at the computer a search request from the user interface node; using the computer to conduct a search of a corpus of documents to identify documents containing an entity named in the search request; using the computer to cause the user interface node to display a list of documents identified as a result of the search; determining at least one of a plurality of informational items abut the listed documents including one or more of (a) a degree of relevance to the search request, (b) a date of the information, (c) a portion of the document which is original, and (d) a list of entities related to the named entity; and using the computer to cause the user interface node to display the determined informational items.

In some embodiments, the method may further include the steps of receiving, at the computer, an indication of a selection of a first document from the listed documents; using the computer to compute indicators and metrics of the first document's relationships to at least one target document in the corpus; and causing the user interface node to display the indicators and the metrics in a tree structure. The indicators and metrics may be selected from the group consisting of (a) an indication of like semantic pairs between the first document and a target document; (b) an indication of a presence of original material in a target document, relative to the first document, for a particular entity and/or semantic pair; (c) an indication of borrowing direction between the first document and a target document; (d) a measure of a size of the first document; (e) a measure of a size of a target document; (f) a measure of textual overlap between the first document and a target document; (g) a measure of relationship overlap between the first document and a target document; and (h) a measure of relationship overlap between the first document and a selection portion of a target document.

In yet another aspect, the invention provides a computer program product for displaying document relationship information to a user. The computer program product comprises a computer readable medium storing computer readable program code. The computer readable program code comprises a set of instructions for communicating with a user interface node; a set of instructions for receiving a search request from the user interface node; a set of instructions for conducting a search of a corpus of documents to identify documents containing an entity named in the search request; a set of instructions for causing the user interface node to display a list of documents identified as a result of the search; a set of instructions for determining at least one of a plurality of informational items about the listed documents including one or more of (a) a degree of relevance to the search request, (b) a date of the information, (c) a portion of the document which is original, and (d) a list of entities related to the named entity; and a set of instructions for causing the user interface node to display the determined informational items.

In some embodiments, the computer readable program code may further includes a set of instructions for receiving an indication of a selection of a first document from the listed documents; a set of instructions for computing indicators and metrics of the first document's relationships to at least one target document in the corpus; and a set of instructions for causing the user interface node to display the indicators and the metrics in a tree structure. The indicators and metrics may be selected from the group consisting of (a) an indication of like semantic pairs between the first document and a target document; (b) an indication of a presence of original material in a target document, relative to the first document, for a particular entity and/or semantic pair; (c) an indication of borrowing direction between the first document and a target document; (d) a measure of a size of the first document; (e) a measure of a size of a target document; (f) a measure of textual overlap between the first document and a target document; (g) a measure of relationship overlap between the first document and a target document; and (h) a measure of relationship overlap between the first document and a selection portion of a target document.

In still another aspect, the invention provides a computer-implemented method for searching through a corpus. The corpus comprises a plurality of documents. The method comprises: using a computer to parse a text of each of the plurality of documents into sentences; using the computer to identify named entities within the sentences; using the computer to pair named entities appearing together in the sentences; using the computer to receive a search request, the search request including at least one name of an entity of interest; and providing at least one search result in response to the search request. The at least one result includes an identification of a document from the corpus that contains the at least one named entity of interest and at least one associated entity determined by the computer to be related to the at least one named entity of interest based on the paired entities recognized by the computer. The step of providing at least one search result may include providing a date associated with the identified document. The step of providing at least one search result may include providing an indication of a portion of the identified document not copied from an earlier document.

In some embodiments, the method may further include the step of using the computer to assign each of the named entities to a category selected from the group consisting of a person, an organization, a location, and a date. The step of providing at least one result may include providing a list of documents in an order based on a determined relevance of each respective result to the at least one name of an entity of interest. The method may further include the step of using the computer to assess a similarity between a document selected from the list and other documents in the corpus based at least in part on the paired entities. The method may further include the step of enabling a user to search through the other documents based on the assessed similarity by displaying a selectable database containing a subset of the other documents.

The selectable database may be searchable according to named entity categories, such that when a user selects a named entity category, the method further comprises providing a list of named entities assigned to the selected category and contained in the selected document, such that the user is able to further narrow the search by selecting a particular named entity. When the user selects a particular named entity, the method may further include displaying at least one of the other documents which contains the selected named entity and an indicator of the assessed similarity between the selected document and the displayed at least one of the other documents. The method may further comprise causing a user to be presented with names of associated entities based on the paired entities when typing a search request.

In yet another aspect, the invention provides a system for searching through a corpus. The corpus comprises a plurality of documents. The system comprises a server node configured to communicate electronically with a user interface node. The server node is configured to: parse a text of each of the plurality of documents into sentences; identify named entities within the sentences; and pair named entities appearing together in the sentences. When the server node receives a search request including at least one name of an entity of interest from the user interface node, the server node is further configured to transmit to the user interface node at least one search result in response to the search request. The at least one search result includes an identification of a document from the corpus that contains at least one named entity of interest and at least one associated entity determined by the server node to be related to the at least one named entity of interest based on the paired entities recognized by the server node. The at least one search result may further include a date associated with the identified document. The at least one search result may further include an indication of a portion of the identified document not copied from an earlier document.

In some embodiments, the named entities may be assigned to a category selected from the group consisting of a person, an organization, a location, and a date. The server node may be further configured to transmit to the user interface a list of documents in an order based on a determined relevance of each respective result to the at least one name of an entity of interest. The server node may be further configured to assess a similarity between a document selected from the list and other documents in the corpus based at least in part on the paired entities. The server node may be further configured to enable a user to search through the other documents based on the assessed similarity by causing the user interface node to display a selectable database containing a subset of the other documents.

The selectable database may be searchable according to named entity categories, such that when a user selects a named entity category, the server node is further configured to cause the user interface node to display a list of named entities assigned to the selected category and contained in the selected document, such that the user is able to further narrow the search by selecting a particular named entity. When the user selects a particular named entity, the server node may be further configured to cause the user interface node to display at least one of the other documents which contains the selected named entity and an indicator of the assessed similarity between the selected document and the displayed at least one of the other documents. The server node may be further configured to cause the user interface node to display names of associated entities based on the paired entities when a user is typing a search request.

In still another aspect, the invention provides a computer program product for searching through a corpus. The corpus comprises a plurality of documents. The computer program product comprises a computer readable medium storing computer readable program code. The computer readable program code comprises: a set of instructions for parsing a text of each of the plurality of documents into sentences; a set of instructions for identifying named entities within the sentences; a set of instructions for pairing named entities appearing together in the sentences; a set of instructions for receiving a search request, the search request including at least one name of an entity of interest; and a set of instructions for providing at least one search result in response to the search request. The at least one search result includes an identification of a document from the corpus that contains the at least one named entity of interest and at least one associated entity determined to be related to the at least one named entity of interest based on the recognized paired entities. The at least one search result may further include a date associated with the identified document. The at least one search result may further include an indication of a portion of the identified document not copied from an earlier document.

In some embodiments, the computer readable program code may further include a set of instructions for assigning each of the named entities to a category selected from the group consisting of a person, an organization, a location, and a date. The computer readable program code may further include a set of instructions for providing a list of documents in an order based on a determined relevance of each respective result to the at least one name of an entity of interest. The computer readable program code may further include a set of instructions for assessing a similarity between a document selected from the list and other documents in the corpus based at least in part on the paired entities. The computer readable program code may further include a set of instructions for enabling a user to search through the other documents based on the assessed similarity by displaying a selectable database containing a subset of the other documents.

The selectable database may be searchable according to named entity categories, such that when a user selects a named entity category, the computer readable program code further includes a set of instructions for providing a list of named entities assigned to the selected category and contained in the selected document, such that the user is able to further narrow the search by selecting a particular named entity. When the user selects a particular named entity, the computer readable program code may further include a set of instructions for displaying at least one of the other documents which contains the selected named entity and an indicator of the assessed similarity between the selected document and the displayed at least one of the other documents. The computer readable program code may further include a set of instructions for causing the user to be presented with names of associated entities based on the paired entities when typing a search request.

In still another aspect, the invention provides a computer-implemented method for comparing content overlap between a first document and a second document. The method comprises: using a computer to parse a text of each of the first and second documents into constituent units; using the computer to compute a digest of each of the first and second documents based on the constituent units; using the computer to compare the computed digests; and using the computer to compute a proportion of common contents between the first and second documents and a proportion of distinct contents between the first and second documents based on the comparison.

In some embodiments, the method may further include the steps of using the computer to determine a date associated with the first document and a date associated with the second document, and using the computer to determine a direction of borrowing based on the determined dates. The method may further include creating a graphical display to indicate the proportion of common contents and to indicate the proportion of distinct contents. Alternatively, the method may further include creating a graphical display to indicate the proportion of common contents, the proportion of distinct contents, a length of the first document, and a length of the second document. The step of using a computer to parse the text of each of the first and second documents into constituent units may include using the computer to parse the text of each of the first and second documents into sentences. The step of using the computer to compute a digest of each of the first and second documents may include using the computer to determine a number of sentences contained in each of the first and second documents and determining a sentence signature for each of the sentences. The step of using the computer to compare the computed digests may include using the sentence signatures and the respective numbers of sentences contained in each of the first and second documents to perform the comparison.

In yet another aspect, the invention provides a computer-implemented method for comparing content overlap between a target document and at least one additional document. The method comprises: using a computer to parse a text of each of the target and at least one additional document into constituent units; using the computer to identify named entities within each of the constituent units; using the computer to pair identified named entities which appear together within the constituent units; and using the computer to assess a similarity between the target document and the at least one additional document based on a result of the paired entities.

In some embodiments, the method may further include the steps of using the computer to determine a date associated with the target document and a date associated with the at least one additional document, and using the computer to determine a direction of borrowing based on the determined dates. The step of using the computer to assess may further include using the computer to calculate a similarity score by applying a Term Frequency-Inverse Document Frequency (TF-IDF) formula to the paired entities.

In some embodiments, the method may further include the steps of using the computer to compute a digest of each of the target document and the at least one additional document based on the constituent units; using the computer to compare the digest corresponding to the target document to the digest corresponding to the at least one additional document; and using a result of the comparing to determine which text in the target document is original to the target document. The step of using a computer to parse the text of each of the target and at least one additional documents into constituent units may further include using the computer to parse the text of each of the target and at least one additional documents into sentences. The step of using the computer to compute a digest of each of the target document and the at least one additional document may further include using the computer to determine a number of sentences contained in each of the target and at least one additional documents and determining a sentence signature for each of the sentences. The step of using the computer to compare the computed digests may further include using the sentence signatures and the respective numbers of sentences contained in each of the target and at least one additional documents to perform the comparison. The step of using the computer to assess may further include using the computer to calculate a first similarity score by applying a Term Frequency-Inverse Document Frequency (TF-IDF) formula to the paired entities for all text, and using the computer to calculate a second similarity score by applying a TF-IDF formula to the paired entities only for text that is determined to be original to the target document.

In still another aspect, the invention provides a system for comparing content overlap between documents. The system comprises a server node in electronic communication with a user interface node. The server node is configured such that, when a user uses the user interface node to submit a content comparison request relating to a first document and a second document, the server node is configured to: parse a text of each of the first and second documents into constituent units; compute a digest of each of the first and second documents based on the constituent units; and compare the computed digests; and compute a proportion of common contents between the first and second documents and a proportion of distinct contents between the first and second documents based on the comparison.

In some embodiments, the server node may be further configured to determine a date associated with the first document and a date associated with the second document, and to determine a direction of borrowing based on the determined dates. The server node may be further configured to create a graphical display to indicate the proportion of common contents and to indicate the proportion of distinct contents, and to cause the user interface node to display the created graphical display. Alternatively, the server node may be further configured to create a graphical display to indicate the proportion of common contents, the proportion of distinct contents, a length of the first document, and a length of the second document, and to cause the user interface node to display the created graphical display. The server node may be further configured to parse the text of each of the first and second documents into sentences. The server node may be further configured to compute the digests of the each of the first and second documents by determining a number of sentences contained in each of the first and second documents and determining a sentence signature for each of the sentences, and to compare the computed digests by using the sentence signatures and the respective numbers of sentences contained in each of the first and second documents to perform the comparison.

In yet another aspect, the invention provides a system for comparing content overlap between documents. The system comprises a server node in electronic communication with a user interface node. The server node is configured such that, when a user uses the user interface node to submit a content comparison request relating to a target document and at least one additional document, the server node is configured to: parse a text of each of the target and at least one additional document into constituent units; identify named entities within each of the constituent units; pair identified named entities which appear together within the constituent units; and assess a similarity between the target document and the at least one additional document based on a result of the paired entities.

In some embodiments, the server node may be further configured to determine a date associated with the target document and a date associated with the at least one additional document, and to determine a direction of borrowing based on the determined dates. The server node may be further configured to calculate a similarity score relating to the target document and the at least one additional document by applying a Term Frequency-Inverse Document Frequency (TF-IDF) formula to the paired entities.

In some embodiments, the server node may be further configured to compute a digest of each of the target document and the at least one additional document based on the constituent units; compare the digest corresponding to the target document to the digest corresponding to the at least one additional document; and use a result of the comparing to determine which text in the target document is original to the target document. The server node may be further configured to parse the text of each of the target and at least one additional documents into sentences. The server node may be further configured to compute the digests of the each of the target document and the at least one additional document by determining a number of sentences contained in each of the target and at least one additional documents and determining a sentence signature for each of the sentences, and to compare the computed digests by using the sentence signatures and the respective numbers of sentences contained in each of the target and at least one additional documents to perform the comparison. The server node may be further configured to calculate a first similarity score by applying a Term Frequency-Inverse Document Frequency (TF-IDF) formula to the paired entities for all text, and to calculate a second similarity score by applying a TF-IDF formula to the paired entities only for text that is determined to be original to the target document.

In still another aspect, the invention provides a computer program product for comparing content overlap between a first document and a second document. The computer program product comprises a computer readable medium storing computer readable program code. The computer readable program code comprises: a set of instructions for parsing a text of each of the first and second documents into constituent units; a set of instructions for computing a digest of each of the first and second documents based on the constituent units; a set of instructions for comparing the computed digests; and a set of instructions for computing a proportion of common contents between the first and second documents and a proportion of distinct contents between the first and second documents based on the comparison.

In some embodiments, the computer readable program code may further include a set of instructions for determining a date associated with the first document and a date associated with the second document, and a set of instructions for determining a direction of borrowing based on the determined dates. The computer readable program code may further include a set of instructions for creating a graphical display to indicate the proportion of common contents and to indicate the proportion of distinct contents. Alternatively, the computer readable program code may further include a set of instructions for creating a graphical display to indicate the proportion of common contents, the proportion of distinct contents, a length of the first document, and a length of the second document. The computer readable program code may further include a set of instructions for parsing the text of each of the first and second documents into sentences. The computer readable program code may further include a set of instructions for determining a number of sentences contained in each of the first and second documents; a set of instructions for determining a sentence signature for each of the sentences; and a set of instructions for using the sentence signatures and the respective numbers of sentences contained in each of the first and second documents to perform a comparison between the first and second documents.

In still another aspect, the invention provides a computer program product for comparing content overlap between a target document and at least one additional document. The computer program product comprises a computer readable medium storing computer readable program code. The computer readable program code comprises: a set of instructions for parsing a text of each of the target and at least one additional document into constituent units; a set of instructions for identifying named entities within each of the constituent units; a set of instructions for pairing identified named entities which appear together within the constituent units; and a set of instructions for assessing a similarity between the target document and the at least one additional document based on a result of the paired entities.

In some embodiments, the computer readable program code may further include a set of instructions for determining a date associated with the target document and a date associated with the at least one additional document, and a set of instructions for determining a direction of borrowing based on the determined dates. The computer readable program code may further include a set of instructions for calculating a similarity score by applying a Term Frequency-Inverse Document Frequency (TF-IDF) formula to the paired entities.

In some embodiments, the computer readable program code may further include a set of instructions for computing a digest of each of the target document and the at least one additional document based on the constituent units; a set of instructions for comparing the digest corresponding to the target document to the digest corresponding to the at least one additional document; and a set of instructions for using a result of the comparing to determine which text in the target document is original to the target document. The computer readable program code may further include a set of instructions for parsing the text of each of the target and at least one additional documents into sentences. The computer readable program code may further include a set of instructions for determining a number of sentences contained in each of the target and at least one additional documents; a set of instructions for determining a sentence signature for each of the sentences; and a set of instructions for using the sentence signatures and the respective numbers of sentences contained in each of the target and at least one additional documents to perform a comparison between the target and at least one additional documents. The computer readable program code may further include a set of instructions for calculating a first similarity score by applying a Term Frequency-Inverse Document Frequency (TF-IDF) formula to the paired entities for all text, and a set of instructions for calculating a second similarity score by applying a TF-IDF formula to the paired entities only for text that is determined to be original to the target document.

The above and other aspects and embodiments are described below with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

FIGS. 2A-2E are screenshots illustrating user-interface aspects of the invention.

FIGS. 3A-3F are Unified Modeling Language illustrations of various aspects of an embodiment of the invention.

FIG. 6 illustrates a screen shot of a highlighted passage of text from a document selected from the list of results shown in FIG. 5, in accordance with exemplary embodiments of the invention.

FIG. 10 illustrates a screen shot of a list of target documents sharing a semantic pair with a selected document, in accordance with exemplary embodiments of the invention.

DETAILED DESCRIPTION OF THE INVENTION

Figure 1:
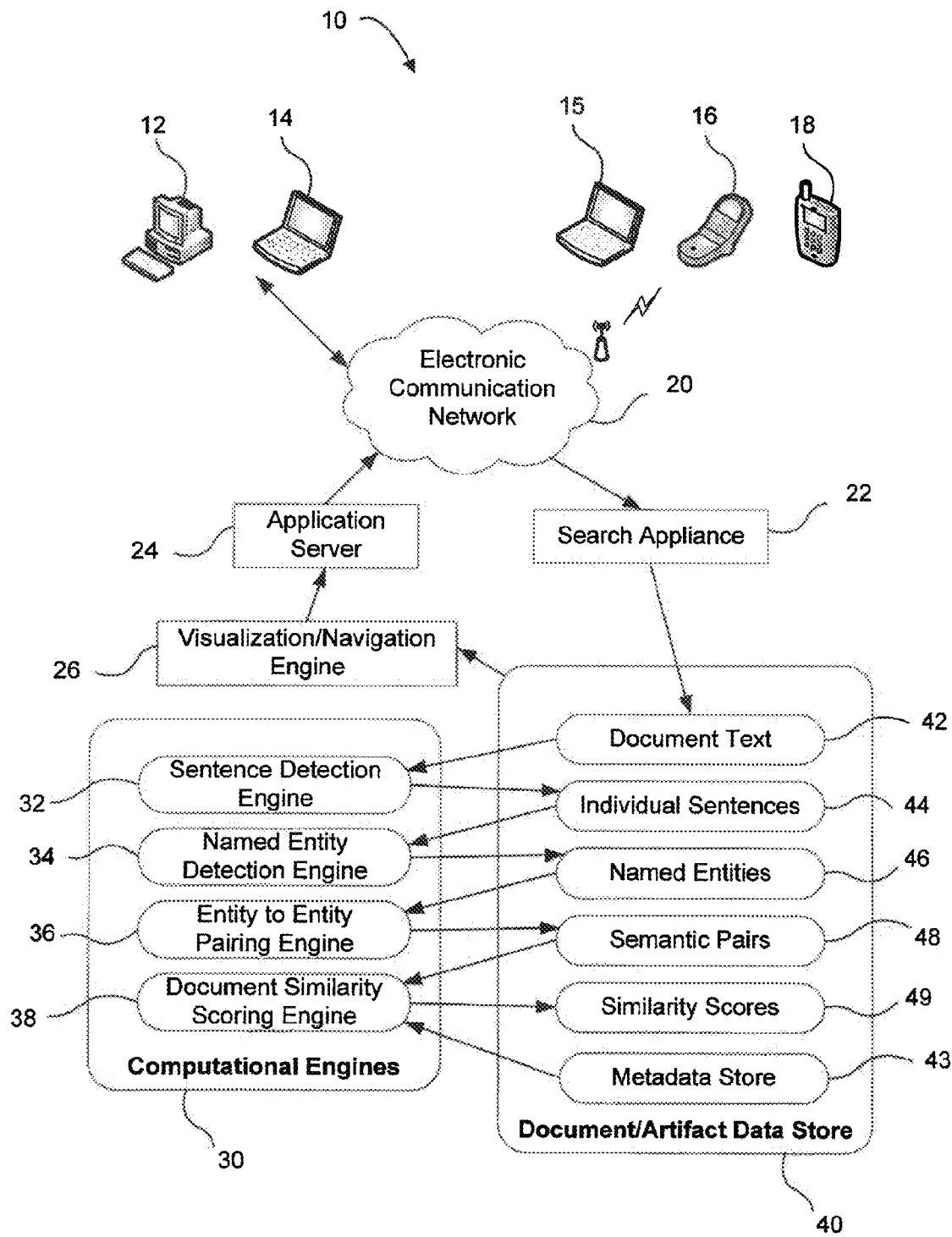
FIG. 1 illustrates a system embodying an aspect of the invention.

With reference to FIG. 1, according to one aspect of the invention, a system 10 is provided whereby interactive client devices having displays (referred to herein as "user interface nodes"), such as computers 12 and 14 having wired connections to an electronic communication network 20 and client devices such as computer 15, browser-equipped cell phone 16 and handheld network accessing device 18 having wireless connections to electronic communications network 20, are enabled to access a search appliance 22 and visualization/navigation engine 26 via application server 24. Electronic communication network 20 may be a public or private network. A client device user may initiate a document search by providing, for example, key words to search appliance 22. Search appliance 22 may perform a key word search of documents indexed and/or stored in document/artifact data store 40 and return a list of matching documents to the client device for display to the user. The user may select a single document (called the "Current Document"). Based on the Current Document, visualization/navigation engine 26 provides a graphical navigator for display on the client device in which the navigator has options allowing the user to identify and explore related documents (called "Target Documents" because they are each potential targets of navigation from the Current Document).

The sentence detection engine 32 of computational engine 30 is configured to parse and process document text received from document text store 42 into sentences or other logical units for storage in individual sentence store 44 and/or transmission to named entity detection engine 34. Named entity detection engine 34 is configured to determine and extract entities from sentences and transmit the entities to entity-to-entity pairing engine 36 and/or named entity storage 46. The entity-to-entity pairing engine 36 is operable to determine and score pair-wise relationships between entities and store results in semantic pairs store 48. Additionally, document similarity scoring engine 38 is operable to use metadata stored in metadata store 43 and other information stored in document/artifact data store 40 in order to compute document similarity scores which may be store in similarity score store 49.

A portion or all of document/artifact data store 40 may comprise a cloud database. Alternatively, document/artifact data store may comprise a database system implemented in a non-cloud computing environment. Computational engines 30, search appliance 22, application server 24 and visualization/navigation engine 26 may comprise computer processor instructions stored in tangible computer readable media for execution by one or more computer processors (referred to herein as the "server node"). One or more of engines 32, 34, 36 and 38 may be implemented across multiple processors as in a MapReduce framework or in a single processor architecture. In some embodiments, computational engines 30 may be implemented in a large scale computing architectures such as a grid or cloud environment.

Relationships between the "Current" document and the various "Target" documents are based on matching extracted semantic pairs. A "Semantic Pair" is a pair (Names, Times, Locations, etc.) that are found in an identifiable unit of the document/artifact, e.g., the same sentence. For example, a sentence such as "Williams is meeting Dale in Houston in February" includes named entities "Williams" and "Dale" (persons), "Houston" (a location), and "February" (a date). Semantic pairs in this sentence could be enumerated as Williams and Dale; Williams and Houston; Williams and February; Dale and Houston; Dale and February; and Houston and February.

This approach provides highly accurate relationship matching and increased accuracy over traditional search and discovery approaches. Individual entities are extracted, joined, and assigned to an individual sentence in order to create the Semantic Pairs. Semantic Pairs are generated by algorithms such as Named Entity Recognizers, specialty software (e.g., text parsers) and text and fact extraction software. Software implementing the algorithms may be executed in a single processor architecture or, preferably, in a multiprocessor architecture, such as one implementing a MapReduce framework.

Embodiments of the invention greatly improve search and discovery accuracy because facts found on the same sentence are more likely to have a relationship than two keywords in the same document. Aspects of the invention are illustrated below with reference first to the user experience and second to the "back-end" processing. Further, the use of sentence-by-sentence duplicate detection can provide an approximation of the notion of "derived work" or "borrowing." When this technique is used in conjunction with a respective document's Date of Information, or timestamp, a direction of borrowing can be determined.

Exemplary embodiments of the invention provide an integrated document navigation framework that indexes a corpus of documents on a particular semantic pair, determines a semantic similarity score between any given pair of documents in the corpus, and provides information relating to content borrowing between documents. These features enable an analyst to become better oriented in what may be a vast collection of undifferentiated records, thereby facilitating the analyst's ability to search and identify relevant documents deserving of further scrutiny. In exemplary embodiments, the invention also provides compelling visual cues to the user indicative of document overlap, semantic similarity and semantic pair navigation.

With regard to the user experience, the accuracy of the navigation and discovery process is illustrated by reference to FIGS. 2A-2E, based on a corpus of reporting documents. FIGS. 2A-2E illustrate an exemplary navigation through a document corpus generated by Visualization/Navigation Engine 26. In one embodiment, Visualization/Navigation Engine 26 creates a collection of html pages suitable for viewing, expanding, and navigating using a modern web browser such as Chrome, available from google.com. In one embodiment, the visualization tool can show similar documents based on common Semantic Pairs important to the user. Such pairs can be predetermined or dynamically generated. Once the user selects a target document, the target document becomes the current document.

In an exemplary embodiment Visualization/Navigation engine 26 may create for display five main information "Areas."

In source document text Area 210, the source document is presented verbatim, and the named entities found in the document may be highlighted or otherwise distinguished from surrounding text. For example, as illustrated in FIG. 2A, a color scheme that enables the user to recognize key entity types, such as red text representing persons, blue text representing organizations, green text indicating locations, and red text indicating temporal information, is used. According to one embodiment, Visualization/Navigation engine 26 can instrument the display to automatically display Semantic Pairs while the user hovers the mouse or otherwise engages highlighted entities.

Figure 2B:
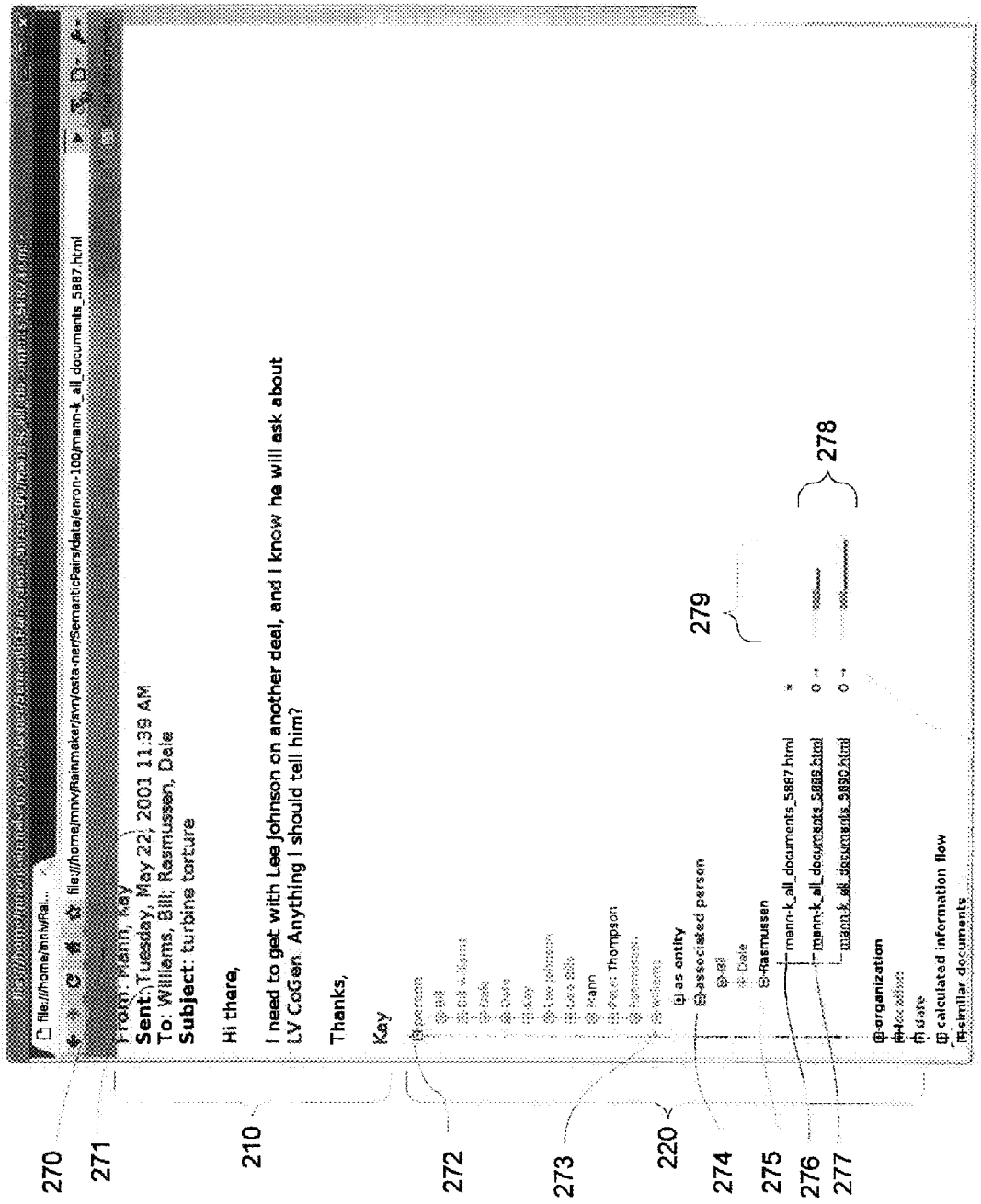

In Area 220, a hierarchical display of extracted relationships (Semantic Pairs) organized by relationship entity type (in this case, person, organization, location, and date) is presented. Referring to FIG. 2B, Area 220 is an expandable hierarchical presentation of the individual entities and relationship (Semantic Pairs) that are found in the source document. Accompanying each entity and relationship, is a list 278 of target documents that contain the same entity/relationship. In the present example, FIG. 2B shows the result of expanding entity type of person 272, then expanding the entity, "Williams" 273, then expanding associated persons 274 under "Williams," and finally expanding the associated person "Rasmussen" 275.

Graphical illustrations 279 depict the degree of content overlap (as assessed by the text-identity of the sentences) between the Current Document 276 and the various Target Documents, e.g., 277, that contain the relationship in question (namely "Williams" associated with "Rasmussen"). The yellow and the cyan bars represent the relative size of the Source and Target Document, while the green bar (where present) shows the amount of content overlap between the two documents. For Target Documents that have overlap with the Current Document 276, an arrow 280 is displayed which shows the computed direction of flow of the information (i.e., which document is the borrower, and which is the donor of the material).

Figure 2C:
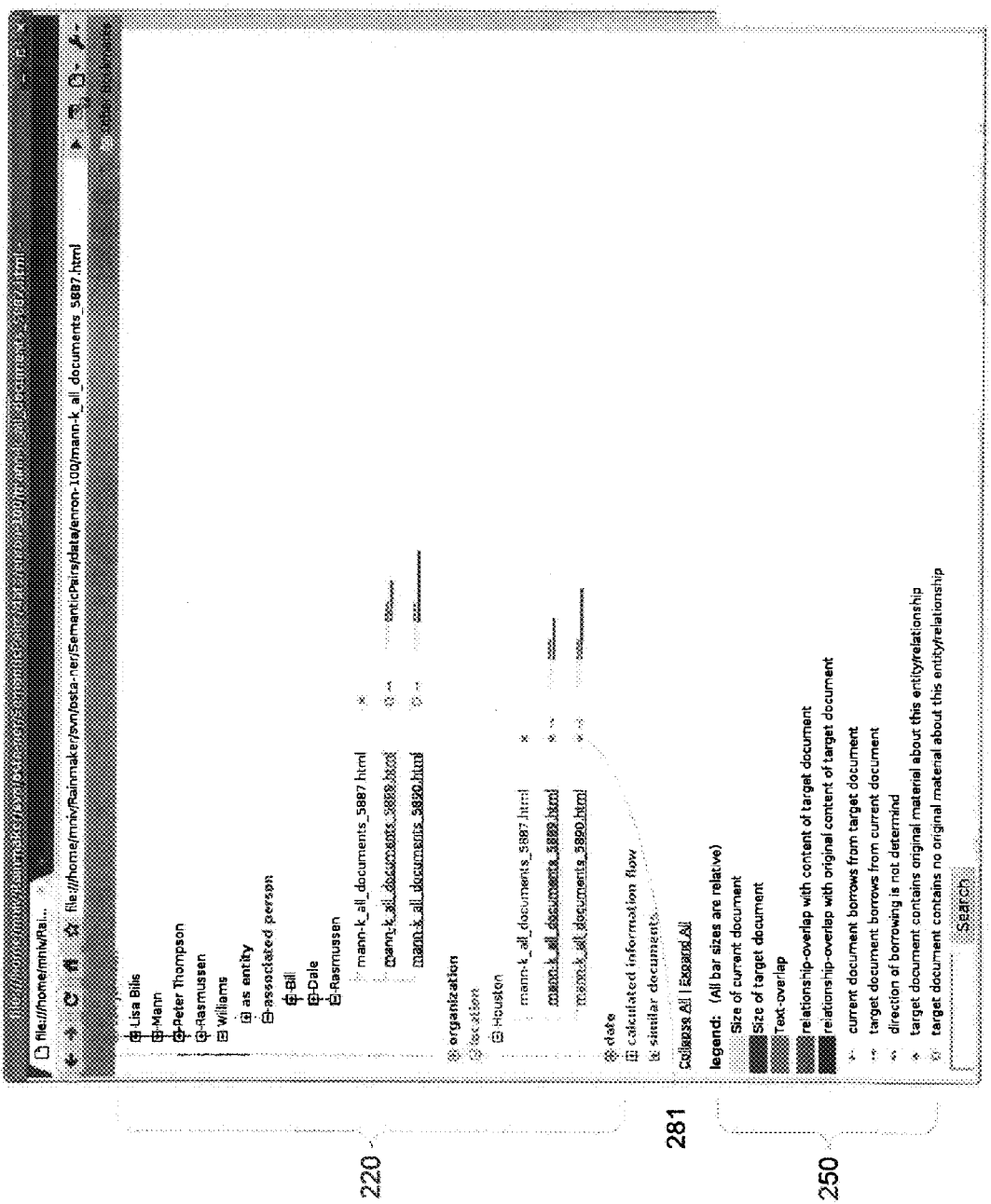

FIG. 2C illustrates exemplary indicators of originality/copying of text. The asterisk 281 marks a target document if it contains one or more occurrence of the relationship of interest in a portion of its text which is original to it, and not borrowed from another document. Combined, the two kinds of graphical information shown in FIGS. 2B and 2C, allow the user to quickly hone in on documents that cover facts of interest, and quickly assess originality and borrowing using a tightly-focused, semantic search perspective.

Figure 2D:
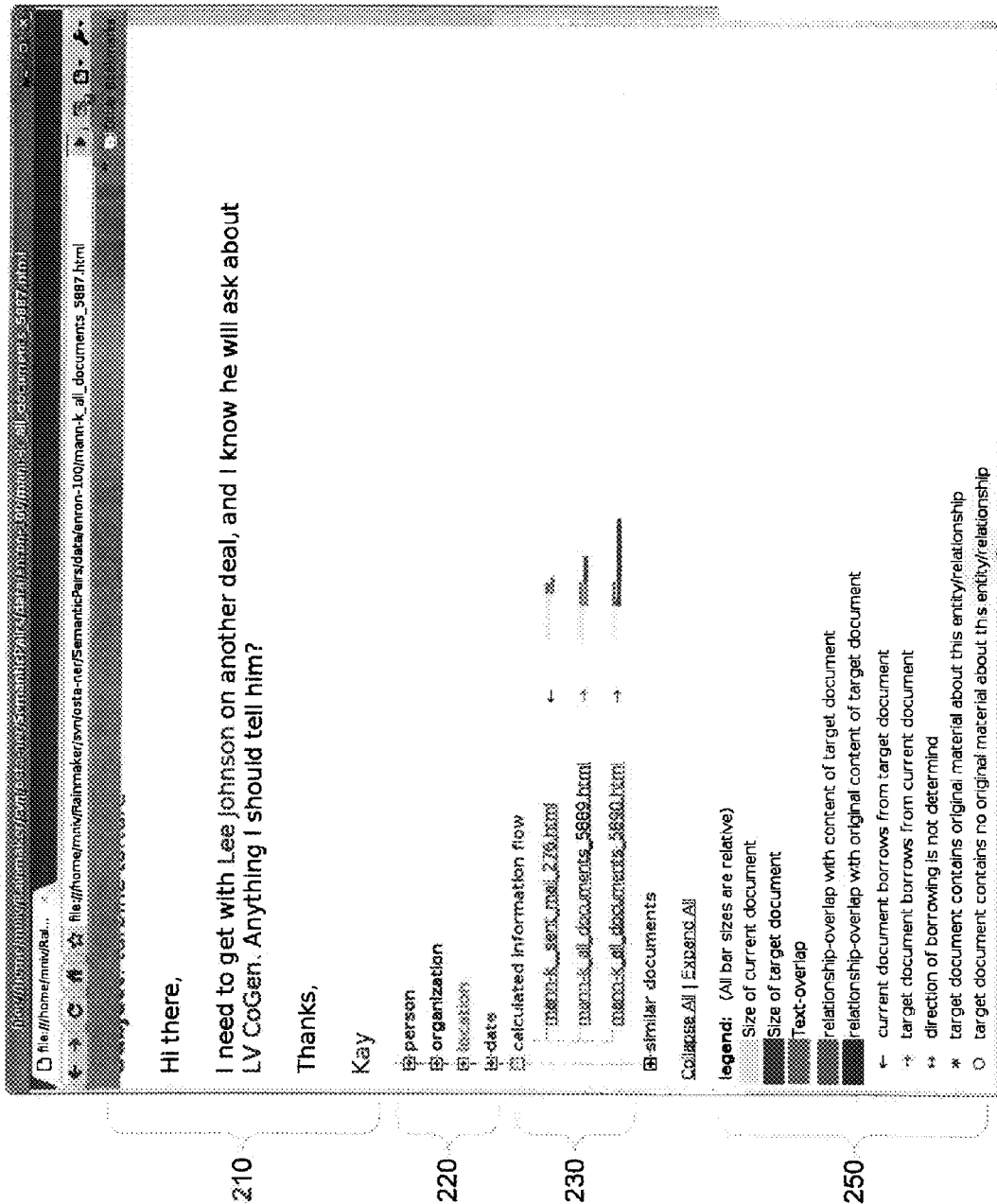

Referring to FIG. 2D, calculated information flow Area 230 presents documents containing text that overlaps with the Current Document. The perspective of Area 230 is the degree of text overlap (i.e. borrowing) without regard to its semantic content. FIG. 2D shows Area 230 expanded. Each Target Document contains the same graphical elements presented in FIG. 2B. This allows the user to get an overview of all the information related to the Current Document.

Figure 2E:
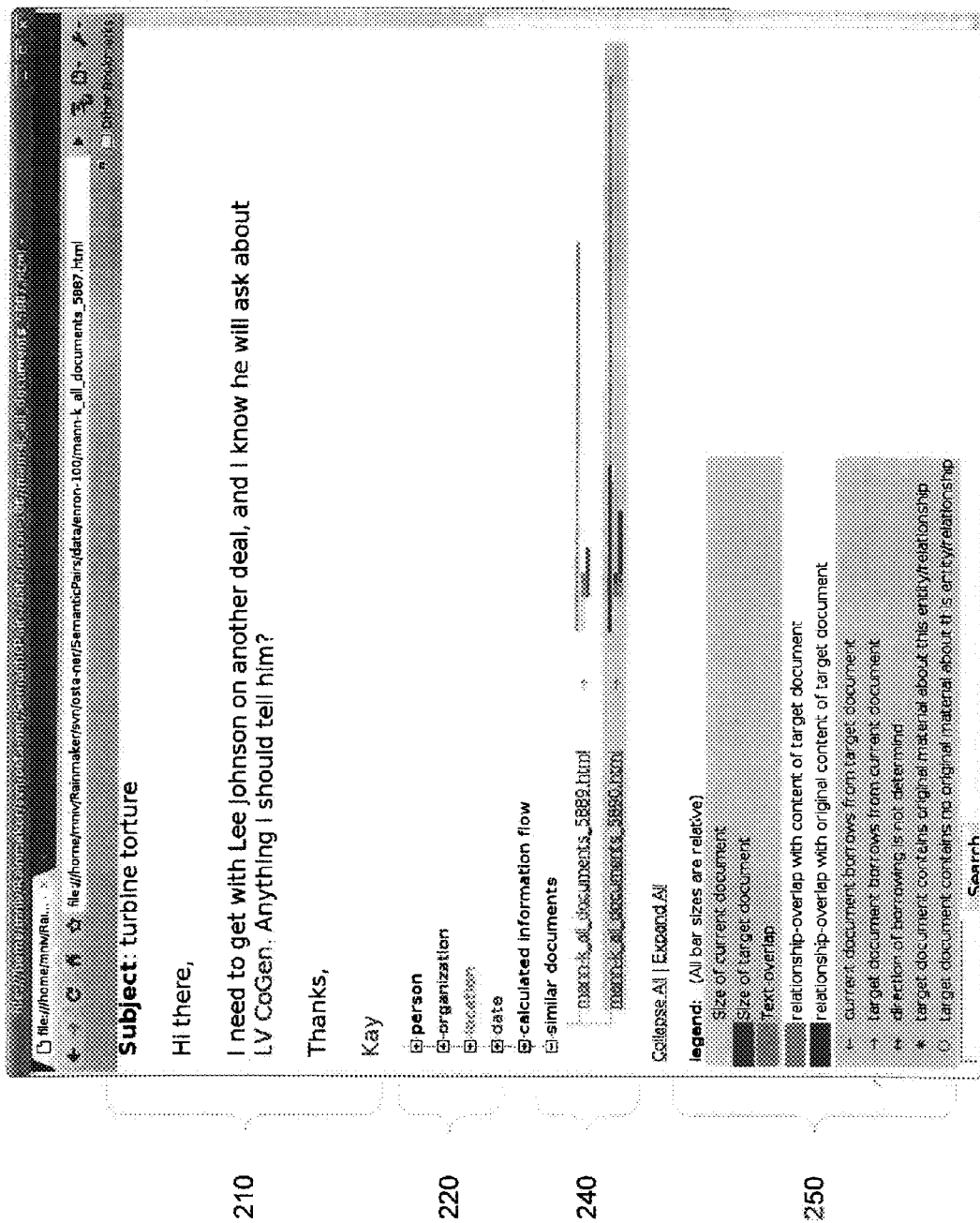

Referring to FIG. 2E, similar documents Area 240 presents a third perspective on information sharing between the Current Documents and Related Target Documents. Whereas the first group, in Area 220, is oriented to specific semantic facts, and the second group, in Area 230 (shown expanded in FIG. 2D), is oriented to holistic document text overlap, the third group, in Area 240 presents a holistic view which aggregates the degree of similarity across all Semantic Pairs in the source and target documents into a document similarity score. In one embodiment, the document similarity score may be calculated using Term Frequency-Inverse Document Frequency (TF*IDF) formula, applying the formula to the set of Semantic Pairs as the universe of Terms. Two variants of this score may be calculated for each possible target document:

a) General similarity score: considers all material in the target document.

b) Original similarity score: considers only material that is original to the target document.

The graphical depiction of these two scores is presented for each document. This allows the user to find additional, related documents that include important entities, but unlike the navigation via Semantic Pairs of Area 220, this navigation relationship does not require the user to focus solely on one entity/relationship. A more comprehensive analysis facilitates discovery of novel documents and relationships which frequently co-occur with an original search-term. It also allows the user to hone in on promising sources of independent evidence/thought/writing/support for the conclusion of interest.

Area 250 provides a legend containing a static display of hints to help the user understand the symbol colors used in the other areas.

In regard to the "back-end" processing, in exemplary embodiments, the invention provides each of the following functions:

Application of semantic pairing (e.g., two entities in the same sentence) to establish relationships between two search items, rather than using common approach of matching keywords to documents. This application includes determining the semantic pairs contained in each document.

Identification of the original generation of relationships across a large dataset in a large scale computing architecture. This identification includes determining the named entities and semantic pairs that are original to each document.

Identification of plagiarized or borrowed content via the matching of content at a unit, e.g., sentence, level.

Identification of similar artifacts or documents based on matching semantic pairs.

Visualization of relationships at the entity and document level; visualization of the level of "borrowed" content from the source document.

In one embodiment, the document similarity score is based on a novel application of a document-distance metric such as TF*IDF. Typically, terms for such metrics are constructed from a single word or a short, contiguous multi-word sequence. In one embodiment, relationships are constructed from pairs of named entities that co-occur in a unit such as a sentence. An advantage of this approach is to focus the power of the document similarity metric on the entity-types of interest and their relationships, while discarding less-discriminative, "softer" words that weaken the document similarity measure through phenomena such as homography, polysemy, and context dependence.

In one aspect of the invention, a Named Entity Recognizer is utilized to recognize Entities (also called Named Entities), i.e., concepts and/or names. The invention can be adapted to work with a plurality of entity recognizers and in different languages. In a preferred embodiment, MUC/ACE compatible Named Entity Recognizers (OpenNLP and Stanford NER) trained on standard English text datasets are used.

A Relationship is a deeper piece of information, typically capturing a relationship in the text about two or more entities. Embodiments of the invention can work with any relationship that can be extracted from the text. For example, a relationship may be defined as a pair of named entities (person, organization, location, date) where at least one of them is person or organization, and where both occur within the same sentence.

For the notion of Sentence, a sentence-boundary detector such, as the OpenNLP sentence boundary detector trained on English text, may be used.

Content overlap may be detected using procedures that rate the extent two passages of text are copies. Such procedures can make use of metadata, e.g., footnotes or web links, in making the determination. In one embodiment a hash, such as an MD5 signature, is computed for each sentence and the hashes are subsequently compared.

For large scale datasets, it is often impractical to compute pair wise navigation relationships and scores among all documents. One approach is to use a MapReduce Framework such as Hadoop. Overlap scores and similarity scores are calculated only for documents that actually have nonzero overlap or similarity.

In one embodiment, all inter-document computation is done in advance, in batch mode, as is the norm for MapReduce computations. The results of this computation need to be stored in a data store that can effectively and responsively be used at run-time to present the navigation options to the user.

The present invention can work with any data storage mechanism and user interface method. In an exemplary embodiment, a web-based system using AJAX calls is used to fetch the required information about navigation target. In a preferred embodiment, all navigation information for one source document was stored in a web page, initially showing only high-level navigation categories, and subsequently presenting more details to the user by un-hiding data elements as needed.

One embodiment of the Invention includes an analytic computation which takes a collection of documents and generates an analysis of the set with navigation links and additional markup as explained above. In one embodiment, the form of this analysis is a collection of html pages suitable for viewing expanding and navigating using a modern web browser such as Chrome, available from Google.

With reference to FIGS. 3A-3F, the analytic computation may be implemented as a collection of Parallel algorithms using a MapReduce Framework having four phases:
    Sentence phase 3B,
    named entity recognition phase 3C,
    persistence phase 3F and
    rendering (see FIG. 1 visualization/navigation engine 26).
In one embodiment, the first three phases may be implemented using Hadoop's MapReduce Framework and the final phase may be implemented as a stand-alone script which can be incorporated as a Hadoop step (using, e.g., Streaming).

Figure 3A:
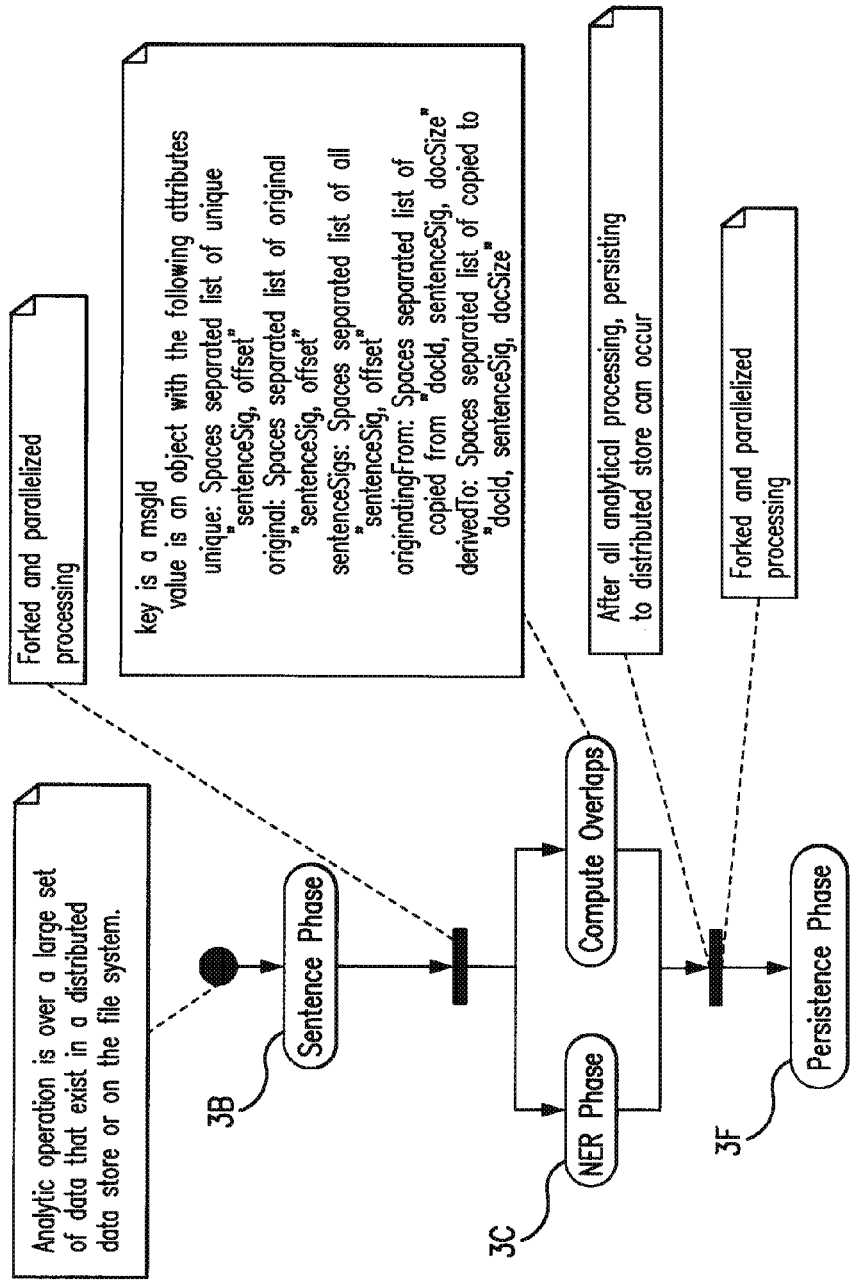
Figure 3B:
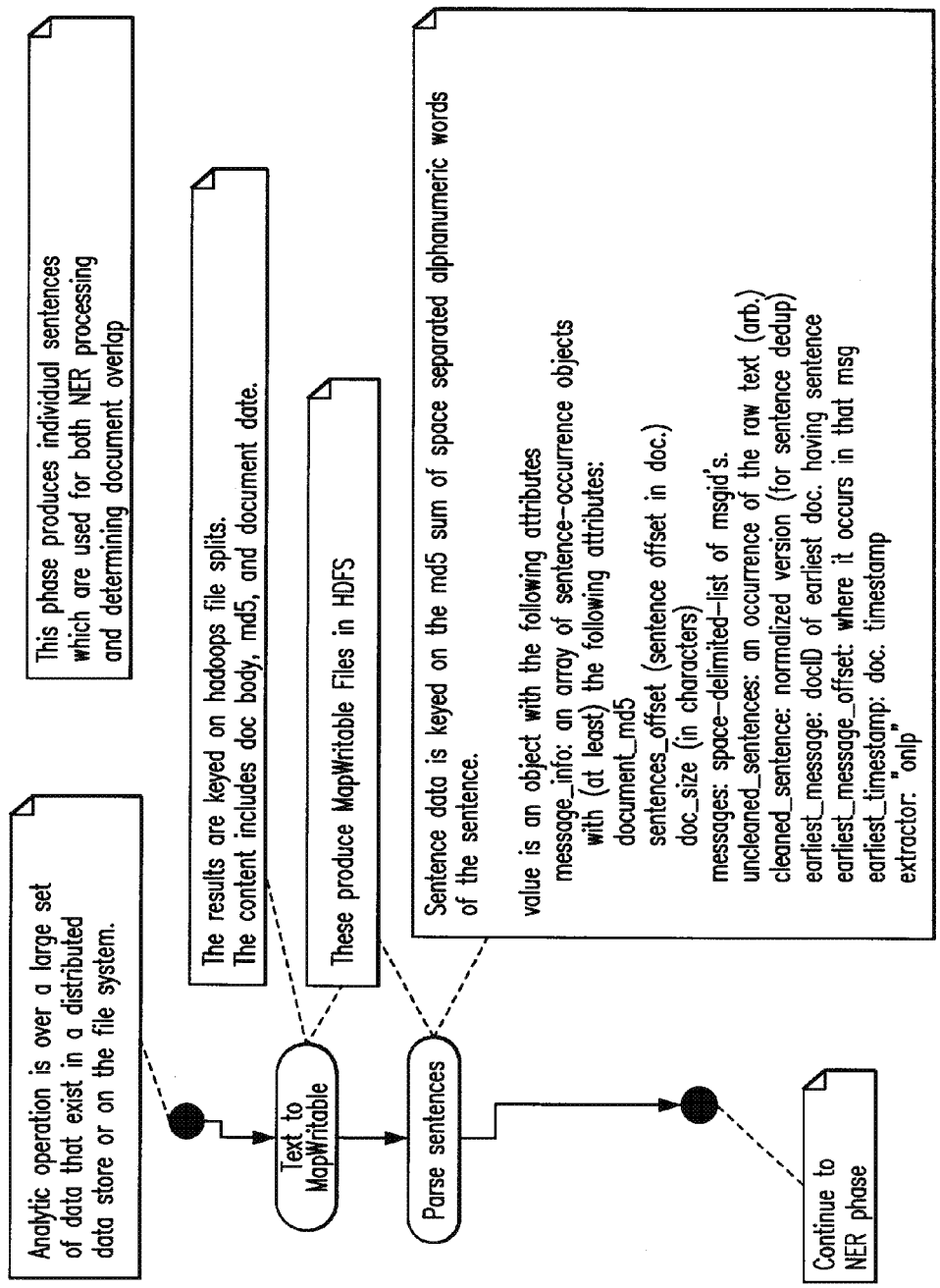

The sentence phase is illustrated in FIG. 3B as a UML Activity Diagram. In this phase, the collection of documents is loaded into a filesystem such as Hadoop's Distributed File System (HDFS), run through a sentence-boundary detector; the sentences' hashes, i.e., MD5 signatures, along with document meta-data such as document path and date are captured and organized to facilitate subsequent processing. In particular, each sentence hash is assigned to the earliest document that contains it.

Figure 3C:
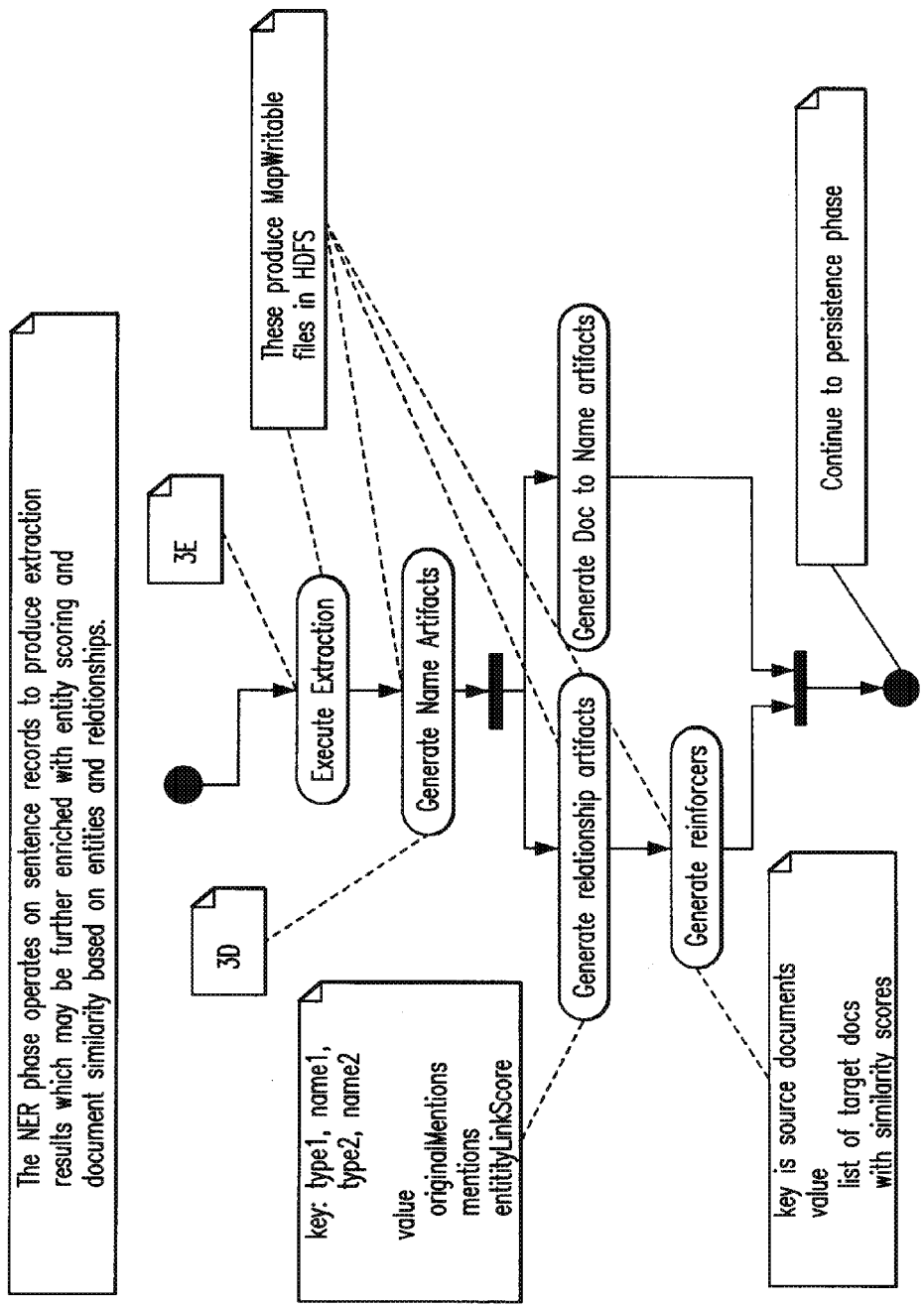

The named entity recognition (NER) phase is illustrated in FIG. 3C and continues with the results of sentence phase as persisted in the filesystem.

In the NER phase, the text of each sentence is run through one or more Named Entity Recognizers. The results are correlated to create semantic pairs. The pairs are correlated by document, to create an entity link score from a semantic pair to a target document. These link scores power Area 220 of the display (see FIG. 2B). In addition, each pair of documents that share sentence hashes is identified and the number of shared sentences recorded, in order to power Area 220 of the display. FIGS. 3D and 3E illustrate additional aspects of the NER phase.

Figure 3F:
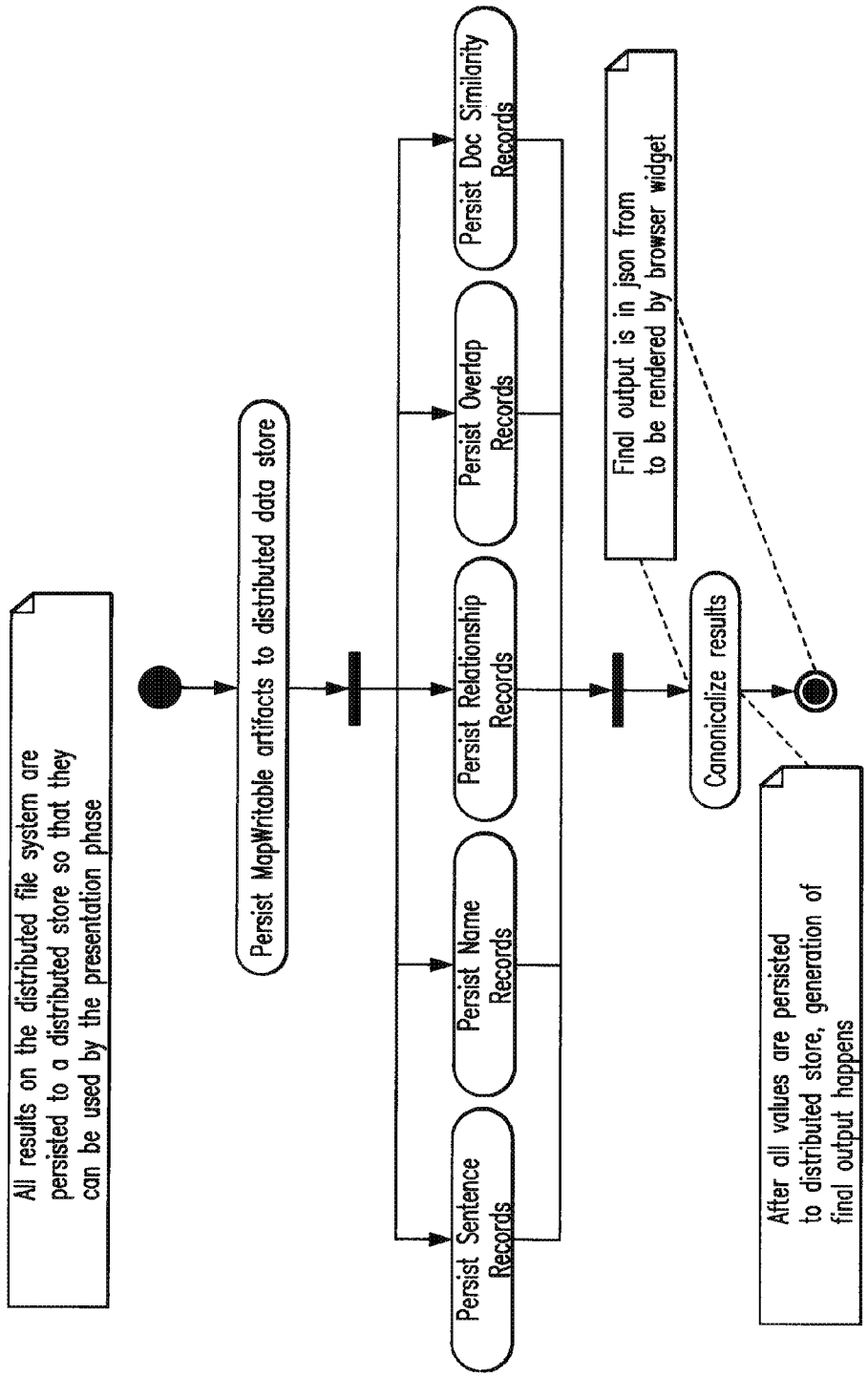

The results of the NER phase are stored, again as an HDFS file which is the input for the persistence phase shown in FIG. 3F.

Figure 4:
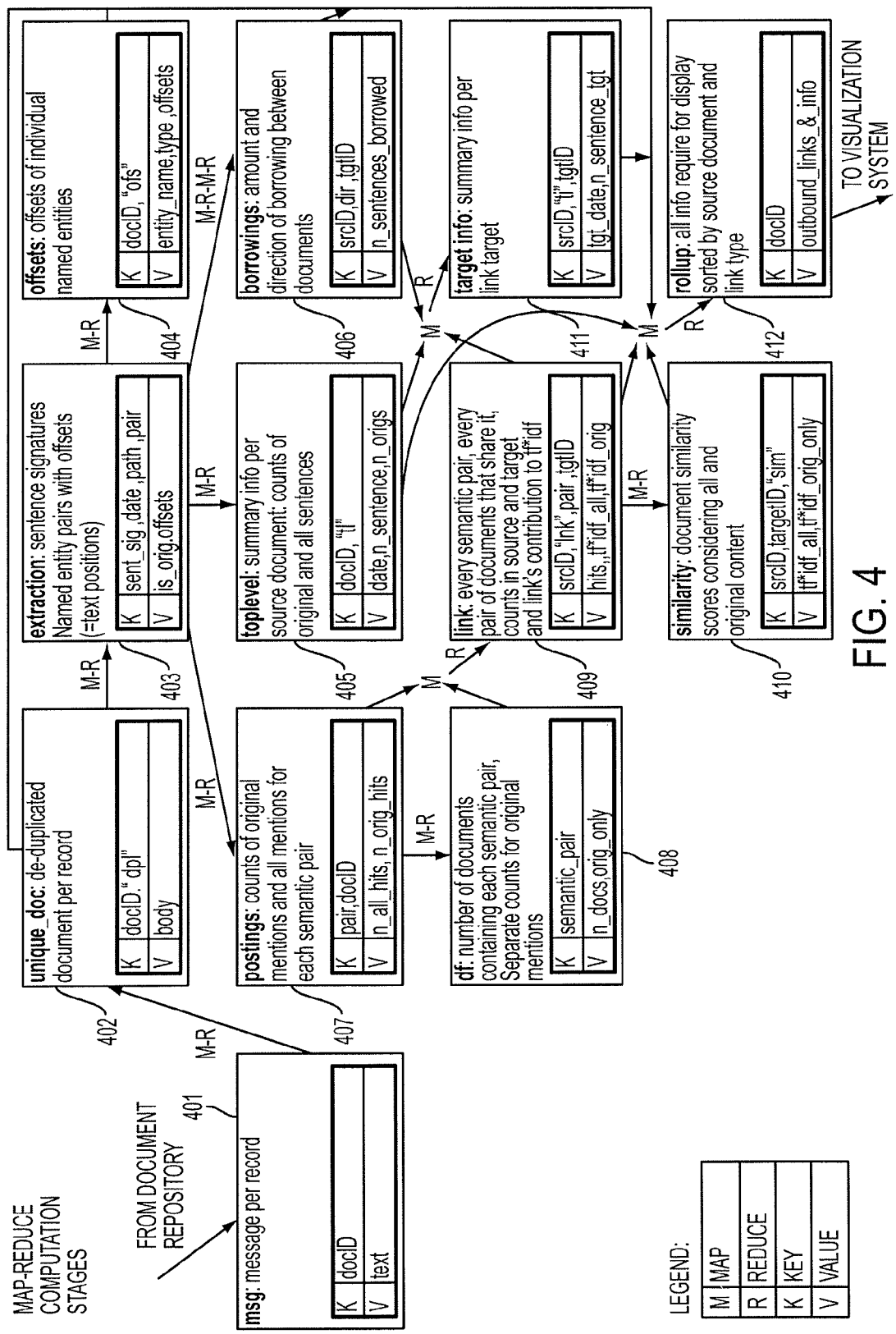
FIG. 4 illustrates MapReduce computation stages according to one embodiment of the invention.

Exemplary computational stages of a MapReduce framework are illustrated in FIG. 4. The analytic computation is implemented as a sequence of Parallel computations. In this exemplary embodiment, twelve phases are provided as illustrated in FIG. 4, illustrating a data flow architecture.

401. Ingest: read in a collection of documents from an internal source, and store it in the Hadoop Distributed File System as a collection of records:
    a. Key: document ID (typically relative file pathname)
    b. Value: text

402. unique_document: remove documents that are exact duplicates, and filter out any non-text file. Format:
    a. Key: document ID, "dpl"
    b. Value: body text

403. extraction: Run a sentence detector to segment each document into sentences. Determine a hash signature for each sentence, to be used for detecting duplicate sentences across documents. Run the available named entity recognition software on each sentence. Generate all pairs of entities that appear with the same sentence. Each such pair is also called "relation". Identify document date, to be used for determining direction of originality. This phase generates one record for each mention of each pair:
    a. Key: sentence signature, document date, document ID, pair
    b. Value: is_original, character offset

404. offsets: isolates just the character offsets from the extraction file. To be used during visualization to highlight the extracted named entity.
    a. Key: document ID, "ofs", entity_name, entity_type
    b. Value: offsets

405. toplevel: Summary information for each source document.
    a. Key: document ID, "tl"
    b. Value: date, number_of_sentences, number_of_original sentences

406. borrowings: using sentence signatures and document dates, identify all pairs of documents that share any sentences, and for each such document-pair, compute the amount of sharing and the direction of the borrowing. This particular phase is remarkable in that instead of a single Map-Reduce pair, we need two pairs: The first pair finds for each sentence signature which documents share it. The second phase aggregates by source document and counts the number of sentences. Output format:
- a. Key: source document ID, direction (either > or <), target document ID
- b. Value: number of sentences borrowed 407. postings: creates an index of all relationships and which documents they appear in. For each relationship-document pair, it tracks the total number of mentions, and the number of mentions in sentences that are original to the document.
- a. Key: pair, document ID
- b. Value: total mentions, mentions in original sentences 408. df: The Document Frequency measure of a term is the number of documents it appears in. Two forms of df are computed: all documents that mention the term, and documents that mention the term in an original sentence.
- a. Key: pair
- b. Value: total number of documents, documents with original mentions 409. link: If we think of a named entity or relationship as a touchpoint, or a link between two documents that both mention the entity or relationship, then this phase computes all the links, and for each link, tracks the number of times that the relationship appears in the source and target of the link, as well as this link's contribution to the overall document-similarity score that considers the influence of all relationships which are shared by the two documents.
- a. Key: source document ID, "lnk", relationship, target ID
- b. Value: all hits in target, original hits in target, original hits in source, contribution to all-mention tf*idf score, contribution to tf*idf score which considers only original mentions 410. similarity: For every pair of related documents, this stage computes two measures of their similarity using the tf*idf score. One measure considers all text in each document, and one considers only the sentences that are original to that document. tf*idf assigns high weight to entities and relationships that are generally rare, but occur frequently in both documents.
- a. Key: source document ID, target document ID, "sim"
- b. Value: tf*idf_all_text, tf*idf_orig_text_only 411. target_info: For each target link (be it an entity navigation link, a document similarity link or a calculated information flow link) this stage computes summary information about the link from the source to the target.
- a. Key: source document ID, "ti", target document ID
- b. Value: target document date, total sentences in target 412. rollup: The final stage accumulates all the information necessary to visualize the link information for each source document. It collects its input from 7 other stages (see diagram) and crucially relies on Map-Reduce's sorting step, as well as the hard-coded tags such as "ti" and "ofs" to identify the various types of record. All this information is then put together and is prepared to export into the visualization system. In the current implementation, this consists of creating a relatively static HTML file which allows the user to explore the outbound link structure as a tree, and click through to links as needed.

In an alternative implementation, the process of ingest may be accelerated and incremental ingest of new documents that builds upon the data previously stored without revisiting the previous stored data may be performed. In this alternative implementation, it is assumed that retrieving the persisted data elements and calculations as described above may be performed at an acceptably fast rate during the user interaction on an as-needed basis.

In the alternative implementation, an ingest-map phase generates four map data structures:

1. Sentences
Key: Sentence MD5
Values: Document identification, document timestamp, document size, sentence raw text 2. Entities
Key: Normalized entity and its semantic category
Values: Total count, original count, identifications of documents that contain the entity 3. Semantic Pairs
Key: Normalized spelling of the named entities in the semantic pair
Values: Total count, original count, identifications of documents that contain the pair 4. Documents
Key: Document identification
Values: Document metadata (including date of information), set of sentence signatures, list of named entities present, list of semantic pairs present, inline markup of text with named entities, and percent original The ingest-reduce stage computes the following four data structures:

1. Sentences
Key: Sentence MD5
Values: Raw text, array with one element for each document that contains the sentence. The array is sorted by date of information. Each array element contains four values, including document identification, date of information, document size, and sentence raw text.

2. Entities
Key: Normalized entity
Values: Global count, array with one element for each document that contains the entity. Each array element contains two values, including original count and total count.

3. Semantic Pairs
Key: Normalized pair
Values: Global count, array with one element for each document containing the pair. Each array element contains two values, including original count and total count.

4. Documents
Key: Document identification
Values: Document metadata (including date of information), set of sentence signatures, list of named entities present, list of semantic pairs present, list of original entities, list of original semantic pairs, inline markup of text with named entities, and percent original.

After the ingest-map and ingest-reduce phases are complete, the results are persisted to a database in a manner that preserves the data structure schema of the results of the ingest-reduce phase. Remaining computations are performed during user interaction based on the values persisted in the database.

Referring now to FIGS. 5-10, a series of screen shots illustrates an example of a user interaction with a system according to a preferred embodiment of the present invention. In the present example, the corpus is the archive of Enron e-mails that was released by the U.S. government as part of its investigation of Enron. A user interacts with the system by using a graphical user interface on a client device, such as, for example, a web browser-based application that includes multiple sub-windows or "widgets." The user initiates a search by specifying a search query, such as, for example, the name of an entity of interest (e.g., a person, an organization, a location, or a date). The system accesses a database into which the corpus has been uploaded, and identifies a set of documents that contain the named entity specified in the search query, i.e., "hits." In exemplary embodiments, for each hit, the system determines several informational items that assist the user in choosing the most relevant among multiple hits. The informational items may include, for example, a degree of relevance to the query; a date of the information; a portion or percentage of the document which is "original," i.e., not copied from an earlier document; and a list of related named entities that most prominently appear in conjunction with the named entity specified in the search query. The list of related entities may include all of the related named entities or a subset of the entities, such as, e.g., the top seven entities.

Figure 5:
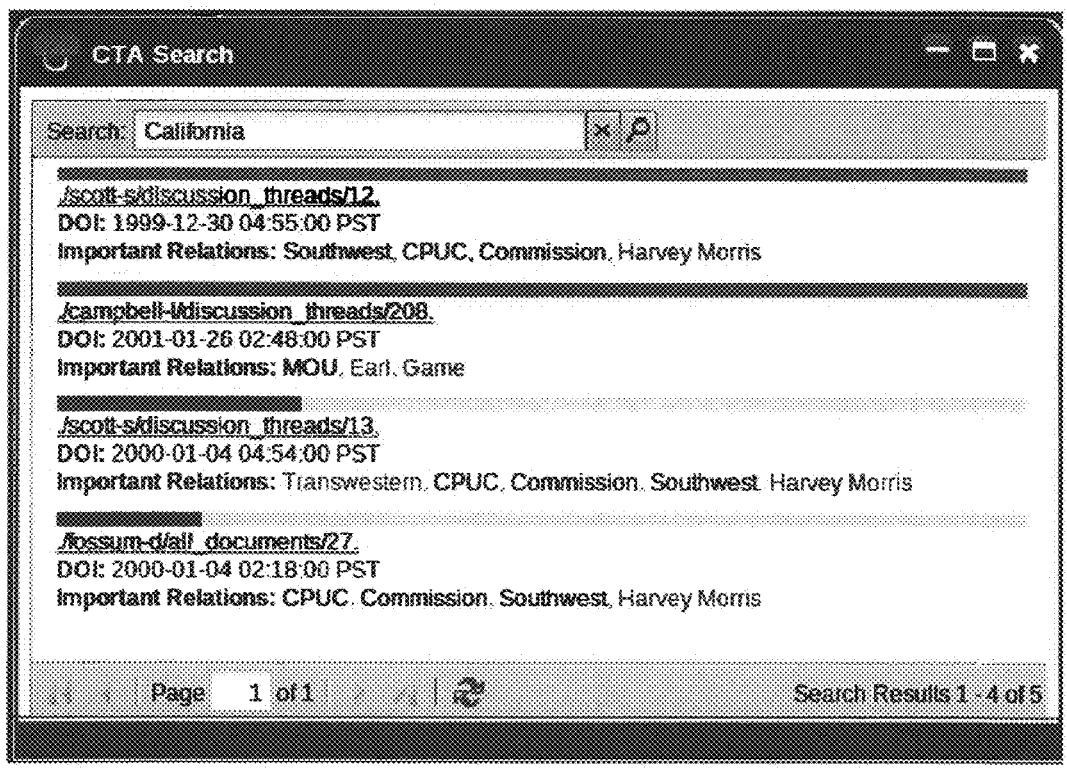
FIG. 5 illustrates a screen shot of a list of results generated in response to a search request, in accordance with exemplary embodiments of the invention.

The system then presents the hits to the user as the search results, in order of relevance. For example, as illustrated in FIG. 5, the user has specified the named entity "California" as the search query, and the system has presented a list of four documents ("./scott-s/discussion_threads/12.", "./campbell-l/discussion_threads/208.", "./scott-s/discussion_threads/13.", and "./fossum-d/all_documents/27.", shown as underlined hypertext links), in order of relevance, together with a date of information ("DOI") and a list of related named entities ("Important Relations") for each document.

When a user selects a specific document by clicking on the corresponding hypertext link, the system presents the text of the document in a window or subwindow and highlights all named entities that were identified by the system's Named Entity Recognition software. For example, as illustrated in FIG. 6, the user has selected the top hit from the list in FIG. 5, and the text of the document appears on the user interface screen. Named entities such as "1996," "CPUC," "El Paso," "Christmas," and "Morris" are highlighted. In exemplary embodiments, the highlighting may be color-coded in accordance with a determined category of the respective named entity. In this manner, for example, names of persons may be highlighted using a first color, location names may be highlighted using a second color, organizational names may be highlighted using a third color, and dates may be highlighted using a fourth color.

When a user selects a specific document, the system may also present the user with a navigation tree in another window or subwindow which enables the user to navigate to other documents, based on relationships with the current or selected documents. The system preferably identifies several types of relationships between documents, including: a degree of overlap of exact sentences (e.g., as a result of copy and paste), together with a direction of borrowing, as determined by the respective dates of information; a presence of individual named entities drawn from the entities in the current document; a presence of relationships drawn from the semantic pairs of entities in the current document; and a whole-document similarity of the other document with respect to the current document, as determined by statistical similarity of occurrence of named entities and relationships.

Figure 7:
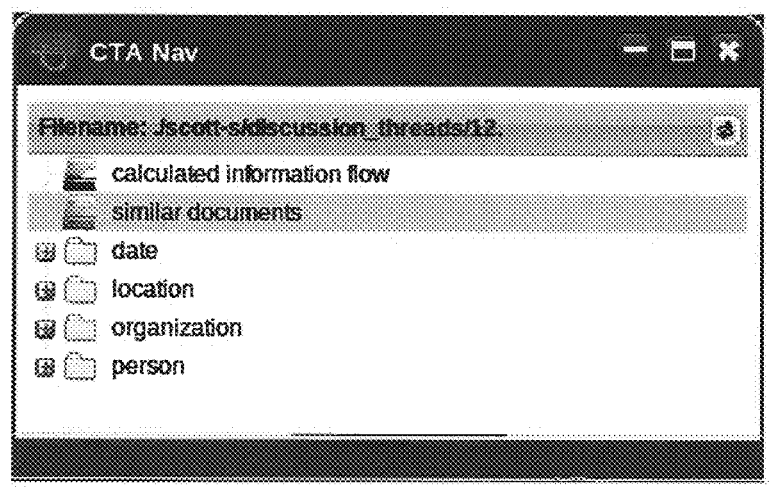
FIG. 7 illustrates a screen shot of a navigation tree for enabling a user to focus a further search of the results illustrated in FIG. 5, in accordance with exemplary embodiments of the invention.
Figure 9:
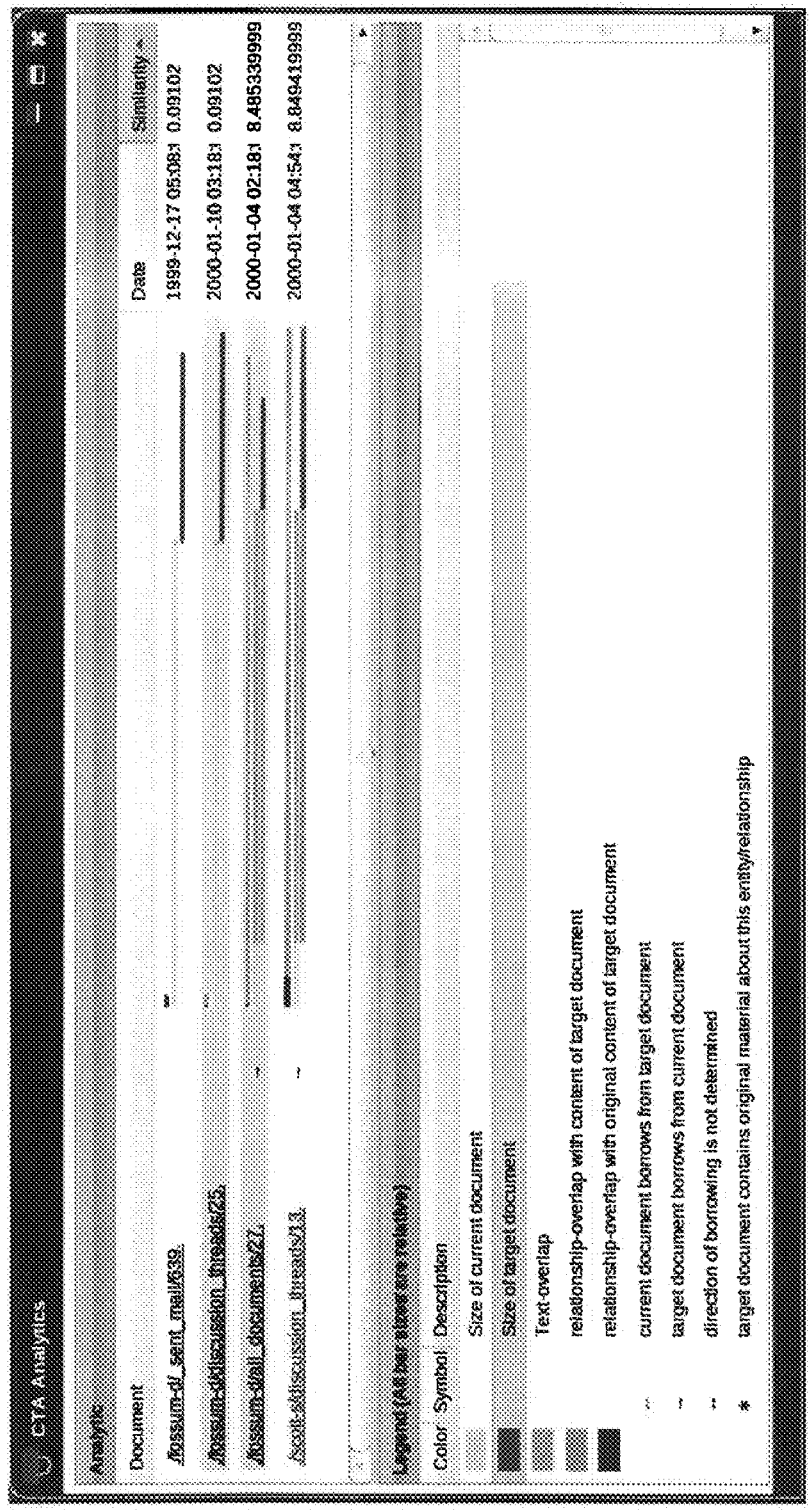
FIG. 9 illustrates a screen shot of a graphical display of similar documents and parameters relating to a degree of similarity, in accordance with exemplary embodiments of the invention.

Referring now to FIG. 7, an example of the navigation tree in its initial form is shown. Referring also to FIG. 9, if the user selects "similar documents," then the system shows documents that are most similar to the current document, as determined by weighing the named entities and semantic pairs shared with the current document, with special emphasis on original mentions. A sentence is considered "original" if it occurs in no other document within the corpus, as determine by the date of information. An occurrence or mention of a particular named entity or semantic pair in a document is considered an "original mention" if the sentence in which it appears is original to that document.

Figure 8:
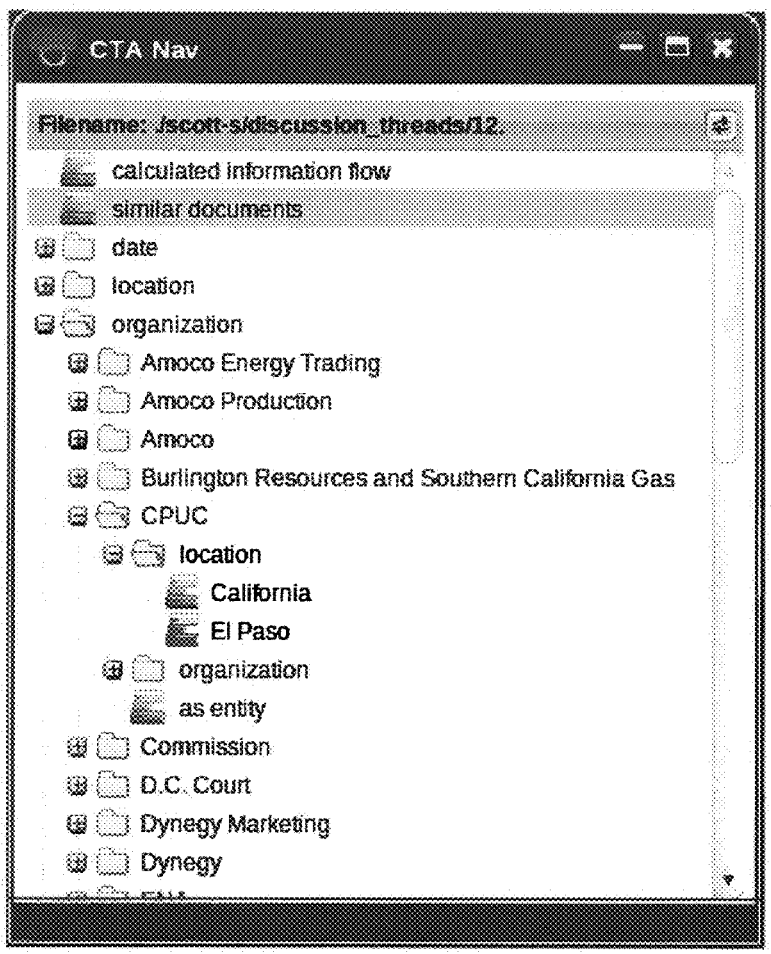
FIG. 8 illustrates a screen shot of an expansion of the navigation tree of FIG. 7 based on semantic pairs, in accordance with exemplary embodiments of the invention.
Figure 10:
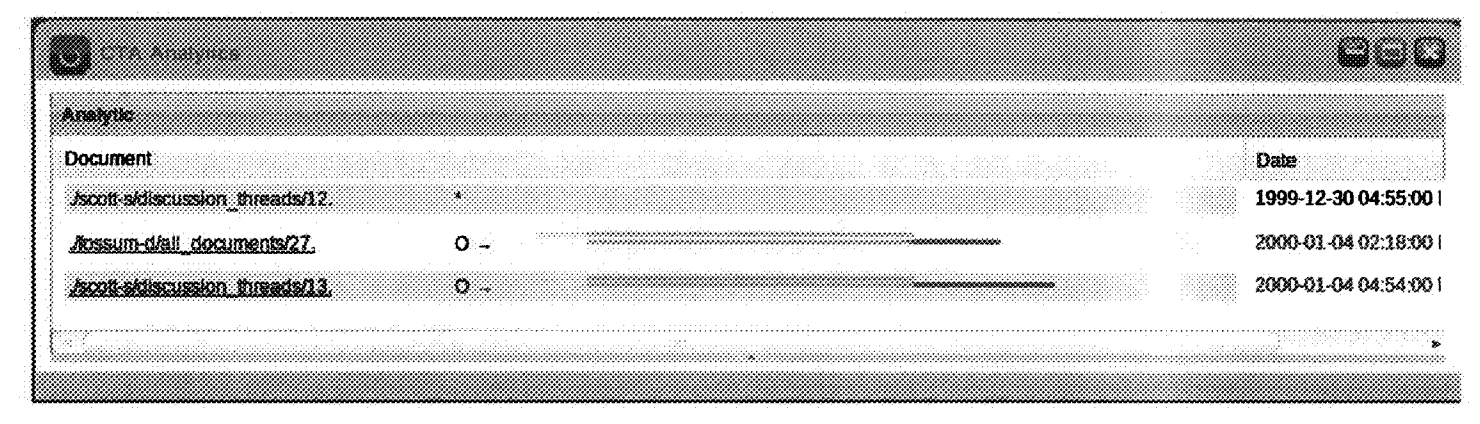

The user can choose to focus in on particular named entities and semantic pairs by exploring the navigation tree, for example, by selecting a tree node to open the tree node. Referring now to FIG. 8, the user has clicked on the node "organization," thereby opening the tree node to a list of named organizational entities that appear in the current document; and then the user has also clicked on the node "CPUC," thereby opening that node to further related nodes. The user has also clicked on the node "location" which lists named locations which are semantically related to "CPUC" within the current document. Referring also to FIG. 10, if the user clicks on a particular location, e.g., "El Paso," in the context of "CPUC", then the system will show documents that contain the semantic pair "CPUC+location:El-Paso," together with graphical depictions relating to the numbers of sentences in the current and target documents, respectively.

Referring now to FIG. 9, an example display of similar documents is shown. The bottom portion of the display includes an explanation of symbols and colors used in the display, and the top portion includes a listing of similar documents. As noted previously, these documents may be referred to as "Target Documents" because they are potential targets of navigation from the current document. Each listed target document includes a document name (e.g., the location of an e-mail message from the publicly released Enron e-mail archive), a graphical depiction of document originality, two graphical depictions of similarity to the current document, the date of information, and a mathematical representation of a similarity score with respect to the current document.

The top purple bar is a depiction of the document-wide similarity score between the current document and the target document. The dark purple portion at the leftmost part of the top bar represents the portion of the similarity score that arises from only original mentions. The yellow bars depict the number of sentences in the current document, and the blue bars depict the number of sentences in the respective target document. The green bars depict the number of sentences that are shared by both documents.

In order to provide the user with the interaction described above, exemplary embodiments of the system compute the following data elements from the input (i.e., a collection of documents):

Segmenting each document in the corpus into sentences, for example, by using a sentence detection algorithm such as, e.g., the sentence detection algorithm included in the OpenNLP open source software package. From the result of the segmenting, the number of sentences contained in each document is determined.

Determining a unique sentence signature for each sentence in the dataset. In one embodiment, upper/lowercase distinctions and minor punctuation may be removed, and then a short digital signature, for example, the so-called MD5 signature, may be computed. Further, using the sentence signatures and the respective numbers of sentences for each document, the number of shared sentence signatures for each pair of documents in the corpus is determined.

Determining a date of information for each document. In a preferred embodiment, the date of information may be determined by extraction from document metadata, such as file headers.

Determining the original document for each sentence signature, based on the sentence signature and the determined dates of information.

Determining the named entities contained in each document, and associating each named entity to the sentence in which it appears. In a preferred embodiment, a named entity detection algorithm, such as, for example, the Stanford Named Entity Detector open source software package, may be used.

For each document, the semantic pairs that it contains based on the sentence detection and named entity data.

For each document, the named entities and semantic pairs that are original to that document based on the sentence signatures, named entities, and semantic pairs data.

For each term t, where t=either a named entity or a semantic pair, calculation of the number of documents that have at least one original mention of t (denoted DF_O(t)) and calculation of the number of documents that have at least one mention of any kind of t (denoted DF_A(t)), derived from the sentence signatures, named entities and semantic pairs.

For each document d and for each term t, calculation of the number of original mentions of t in d (denoted TF_O(d,t)) and calculation of the number of mentions of any kind of t in d (denoted TF_A(d,t)), based on the named entity and semantic pair DF_O(t) and DF_A(t).

For each query term q and for each document d that contains q, calculation of a relevance score of d with respect to q. In one preferred embodiment, score(q,d)= TF_A9D,q)/log(number_of_characters(d)); however, many scoring functions may be used.

For each query term q, for each document d that contains q, for each second term t that co-occurs with q in any sentence of the document, calculation of a score signifying a degree of prominence of the second term t with respect to the query term q and the document d. In a preferred embodiment, the prominence score may be calculated according to the following: p_score(q,t,d)= TF_O(d,<q+t>)/log(1+DR_O(<q+t>)), where <q+t> is the semantic pair consisting of q and t.

For each document, the number of sentences it contains, derived from the sentence detection data.

For each pair of documents, the number of sentence signatures that they share, derived from the sentence detection and sentence signature data.

For each pair of documents d1 and d2, a similarity score Sim_O(d1,d2) relating to original mentions of entities and semantic pairs, and a similarity score Sim_A(d1,d2) relating to all mentions of entities and semantic pairs. In a preferred embodiment, Sim_O(d1,d2)=sum over all semantic pairs t of TF_O(d1,t)*TF_O(d2,t)/log(DF_O(t)); and Sim_A(d1,d2)=sum over all semantic pairs t of TF_A(d1,t)*TF_A(d2,t)/log(DF_A(t)).

The amount of computation necessary to determine the data elements above increases roughly as the square of the input size. However, the present invention has the ability to exploit a large number of computers to solve this problem efficiently. Furthermore, the ability of the invention to use clouds and grid and other parallel computing architectures can further improve efficiency. In addition, the invention may use Hadoop and the Map Reduce framework to solve the problem efficiently.

Figure 11:
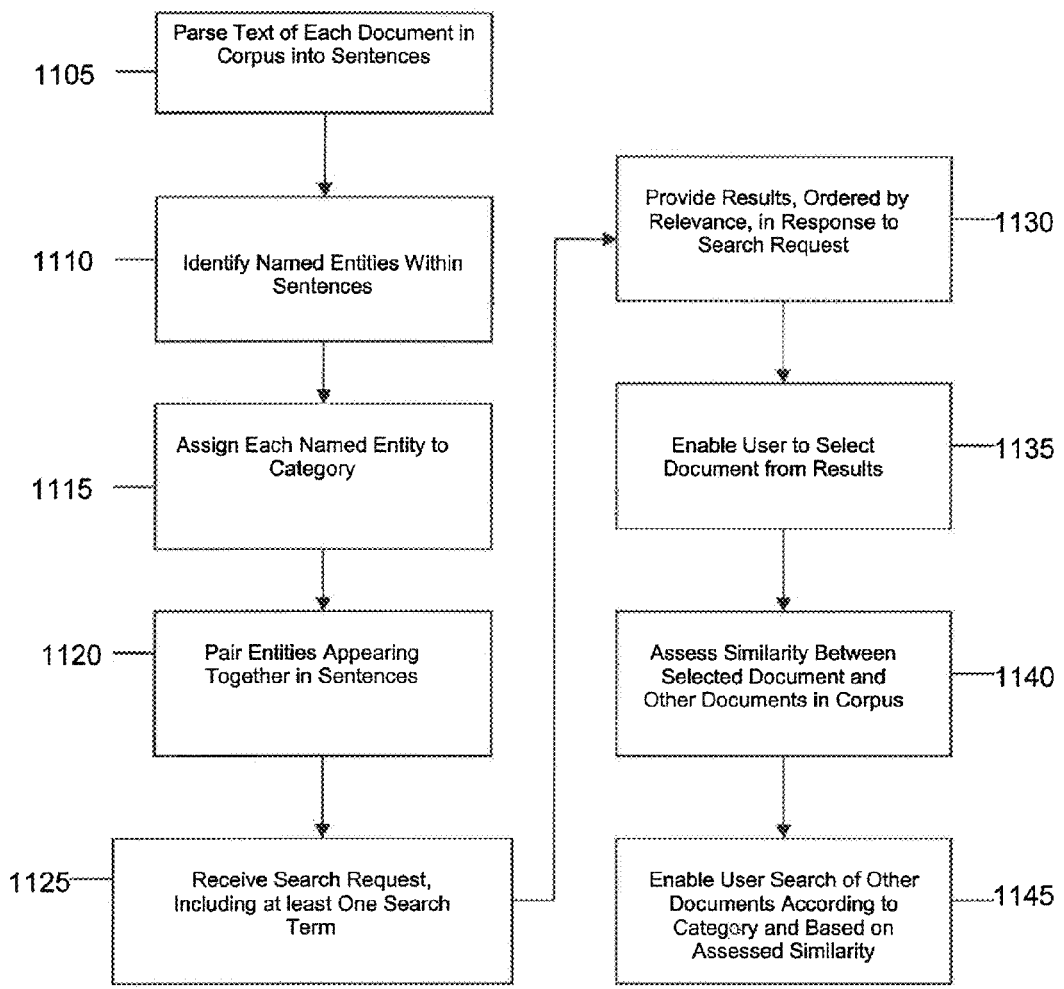
FIG. 11 is a flowchart illustrating a process for searching through a corpus of documents, according to exemplary embodiments of the invention.

Referring now to FIG. 11, a flowchart 1100 illustrates a process for searching through a corpus of documents according to an exemplary embodiment of the present invention. The process begins at step 1105 by parsing the text of each document in the corpus into sentences. At step 1110, named entities within the sentences are identified, and then at step 1115, each named entity is assigned to a category, such as person, organization, location, or date. At step 1120, entities which appear together in sentences are paired to create a data store of semantic pairs.

At step 1125, a search request that includes at least one search term is received from a user. A search is executed based on the search request, and then at step 1130, a set of results is provided in order of relevance. At step 1135, the user is enabled to select a document from the set of results. At step 1140, after the user has selected a document, a similarity between the selected document and each of the other documents in the corpus is assessed. Finally, at step 1145, the user is enabled to search through the other documents in the corpus according to categories of named entities and based on the assessed similarity to the selected document.

Figure 12:
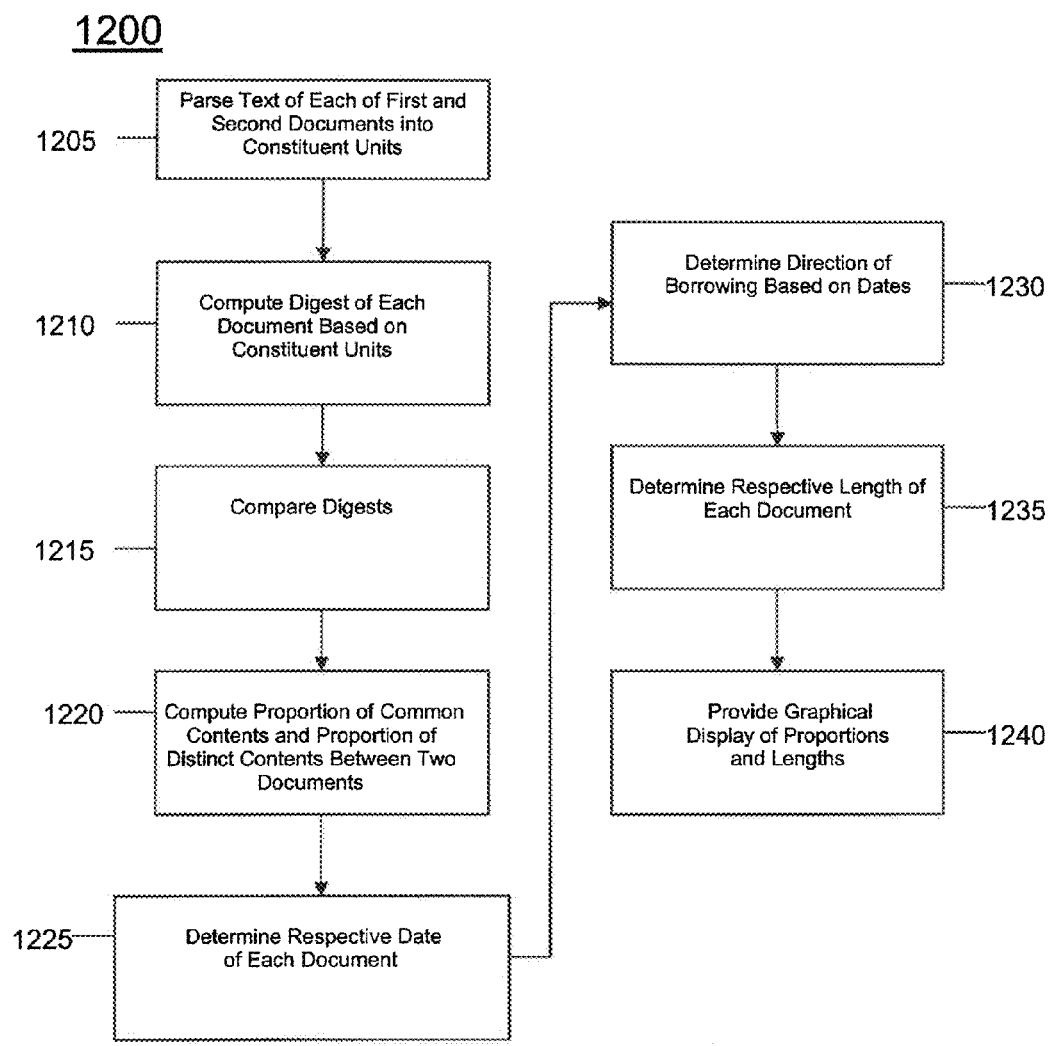
FIG. 12 is a flowchart illustrating a process for comparing content overlap between documents, according to exemplary embodiments of the invention.

Referring now to FIG. 12, a flowchart 1200 illustrates a process for comparing content between two documents in a corpus, according to exemplary embodiments of the present invention. The process begins at step 1205 by parsing the text of each of two documents into constituent units. At step 1210, the constituent units are used to compute a digest of each document. At step 1215, the digests are compared, and then, at step 1220, a proportion of common contents and a proportion of distinct contents between the two documents is computed based on the comparison.

At step 1225, a respective date of each document is determined, and then a direction of borrowing is determined based on these dates at step 1230. At step 1235, a respective length of each document is determined, e.g., from the constituent units or the digests. Finally, at step 1240, a graphical display of the determined proportions and document lengths is provided.

Figure 13:
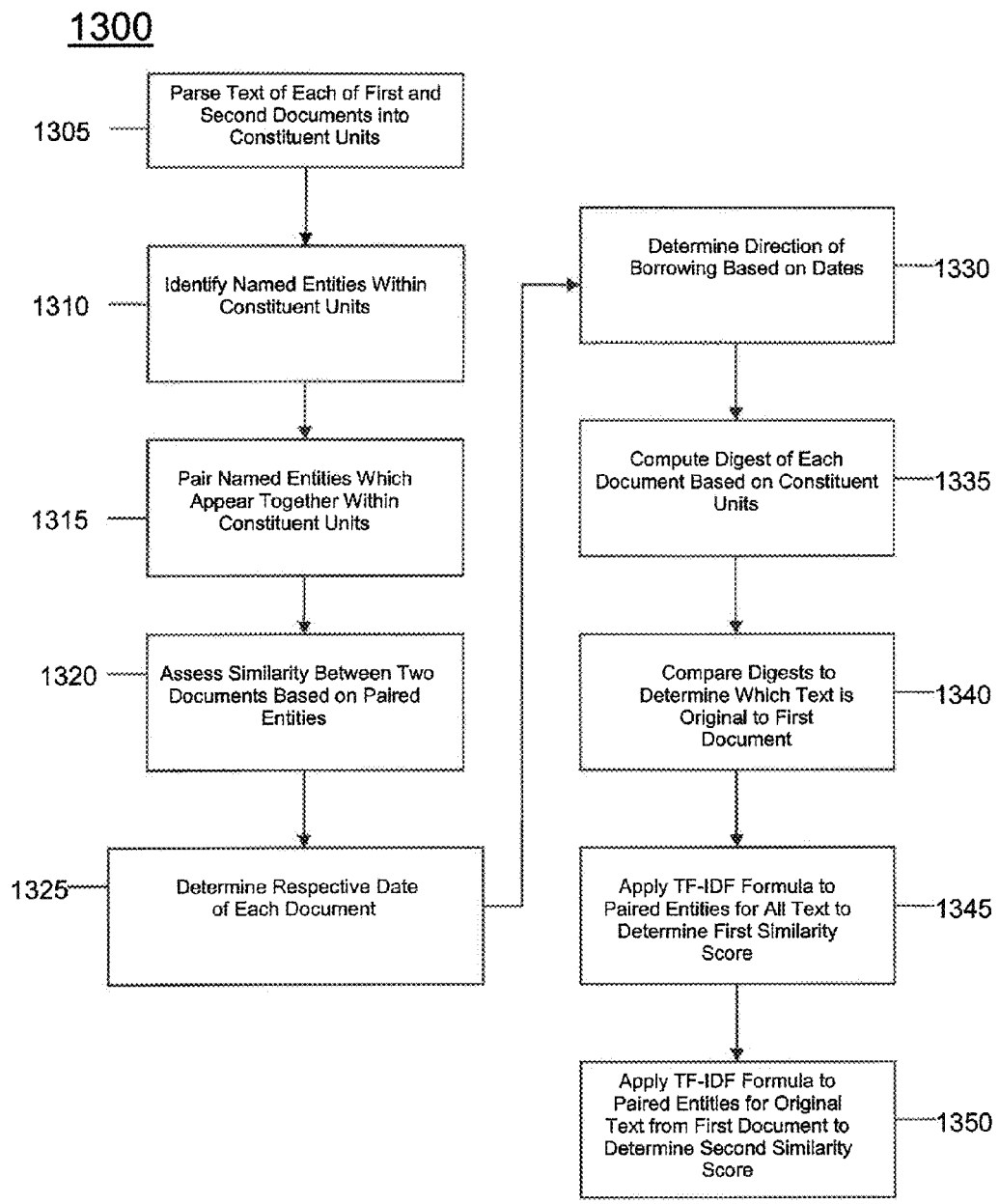
FIG. 13 is a flowchart illustrating a process for comparing content overlap between documents based on semantic pairs, according to exemplary embodiments of the invention.

Referring now to FIG. 13, a flowchart 1300 illustrates a process for comparing content overlap between documents, according to exemplary embodiments of the present invention. The process begins at step 1305 by parsing the text of each of a first document and a second document into constituent units. At step 1310, named entities within the constituent units are identified, and at step 1315, the named entities which appear together within a given constituent unit are paired and stored as respective semantic pairs. At step 1320, a similarity between the two documents is assessed based on the paired entities.

At step 1325, a respective date of each document is determined, and at step 1330, a direction of borrowing is determined based on the respective dates. At step 1335, a digest is computed for each document, based on the constituent units, and at step 1340, the digests are compared to determine which text is original to the first document. At step 1345, a TF-IDF formula is applied to the paired entities for all text in each document to determine a first similarity score. At step 1350, a TF-IDF formula is applied to the paired entities for the original text from the first document to determine a second similarity score.

While various embodiments of the present invention have been described above, it should be understood that they have been presented by way of example only, and not limitation. Thus, the breadth and scope of the present invention should not be limited by any of the above-described exemplary embodiments.

What is claimed is:

1. A computer-implemented method for searching through a corpus, the corpus comprising a plurality of documents, and the method comprising:

using a computer to parse a text of each of the plurality of documents into sentences;

using the computer to identify named entities within the sentences;

using the computer to identify semantic pairs in the documents, wherein each semantic pair comprises two named entities appearing together in a respective one of the sentences;

using the computer to receive a search request, the search request including at least one name of an entity of interest;

using the computer to provide at least one search result in response to the search request wherein the at least one search result includes an identification of a document from the corpus and an indication of one or more responsive semantic pairs in the identified document, wherein the one or more responsive semantic pairs each contain the at least one name of an entity of interest and at least one associated entity determined to be related to the at least one named entity of interest.

2. The method of claim 1, wherein the step of providing at least one search result includes providing a date associated with the identified document.

3. The method of claim 2, wherein the step of providing at least one search result includes providing an indication of a portion of the identified document not copied from an earlier document.

4. The method of claim 1, further comprising using the computer to assign each of the named entities to a category selected from the group consisting of a person, an organization, a location, and a date.

5. The method of claim 1, wherein the step of providing at least one search result includes providing a list of documents in an order based on a determined relevance of each respective result to the at least one name of an entity of interest.

6. The method of claim 5, further comprising the step of using the computer to assess a similarity between a document selected from the list and other documents in the corpus based at least in part on the paired entities.

7. The method of claim 6, further comprising the step of enabling a user to search through the other documents based on the assessed similarity by displaying a selectable database containing a subset of the other documents.

8. The method of claim 7, wherein the selectable database is searchable according to named entity categories, such that when a user selects a named entity category, the method further comprises providing a list of named entities assigned to the selected category and contained in the selected document, such that the user is able to further narrow the search by selecting a particular named entity.

9. The method of claim 8, wherein when the user selects a particular named entity, the method further comprises displaying at least one of the other documents which contains the selected named entity and an indicator of the assessed similarity between the selected document and the displayed at least one of the other documents.

10. The method of claim 1, further comprising causing a user to be presented with names of associated entities based on the paired entities when typing a search request.

11. A system for searching through a corpus, the corpus comprising a plurality of documents, and the system comprising:
a server node configured to communicate electronically with a user interface node;
the server node further being configured to:
parse a text of each of the plurality of documents into sentences;
identify named entities within the sentences; and
identify semantic pairs in the documents, wherein each semantic pair comprises two named entities appearing together in a respective one of the sentences,
wherein, when the server node receives a search request including at least one name of an entity of interest from the user interface node, the server node is further configured to: transmit to the user interface node at least one search result in response to the search request, the at least one search result including an identification of a document from the corpus and an indication of one or more responsive semantic pairs in the identified document, wherein the one or more responsive semantic pairs each contain the at least one name of an entity of interest and at least one associated entity determined to be related to the at least one named entity of interest.

12. The system of claim 11, wherein the at least one search result further includes a date associated with the identified document.

13. The system of claim 2, wherein the at least one search result further includes an indication of a portion of the identified documents not copied from an earlier document.

14. The system of claim 11, wherein the named entities are assigned to a category selected from the group consisting of a person, an organization, a location, and a date.

15. The system of claim 11, wherein the server node is further configured to transmit to the user interface a list of documents in an order based on a determined relevance of each respective search result to the at least one name of an entity of interest.

16. The system of claim 15, wherein the server node is further configured to assess a similarity between a document selected from the list and other documents in the corpus based at least in part on the paired entities.

17. The system of claim 16, wherein the server node is further configured to enable a user to search through the other documents based on the assessed similarity by causing the user interface node to display a selectable database containing a subset of the other documents.

18. The system of claim 17, wherein the selectable database is searchable according to named entity categories, such that when a user selects a named entity category, the server node is further configured to cause the user interface node to display a list of named entities assigned to the selected category and contained in the selected document, such that the user is able to further narrow the search by selecting a particular named entity.

19. The system of claim 18, wherein when the user selects a particular named entity, the server node is further configured to cause the user interface node to display at least one of the other documents which contains the selected named entity and an indicator of the assessed similarity between the selected document and the displayed at least one of the other documents.

20. The system of claim 11, wherein the server node is further configured to cause the user interface node to display names of associated entities based on the paired entities when a user is typing a search request.

21. A computer program product for searching through a corpus, the corpus comprising a plurality of documents, the computer program product comprising a computer readable medium storing computer readable program code, the computer readable program code comprising:
a set of instructions for parsing a text of each of the plurality of documents into sentences;
a set of instructions for identifying named entities within the sentences;
a set of instructions for identifying semantic pairs in the documents, wherein each semantic pair comprises two named entities appearing together in a respective one of the sentences;

a set of instructions for receiving a search request, the search request including at least one name of an entity of interest; and a set of instructions for providing at least one search result in response to the search request, the at least one search result including an identification of a document from the corpus and an indication of one or more responsive semantic pairs in the identified document, wherein the one or more responsive semantic pairs each contain the at least one name of an entity of interest and at least one associated entity determined to be related to the at least one named entity of interest.

22. The computer program product of claim 21, wherein the at least one search result further includes a date associated with the identified document.

23. The computer program product of claim 22, wherein the at least one search result further includes an indication of a portion of the identified document not copied from an earlier document.

24. The computer program product of claim 21, wherein the computer readable program code further comprises a set of instructions for assigning each of the named entities to a category selected from the group consisting of a person, an organization, a location, and a date.

25. The computer program product of claim 21, wherein the computer readable program code further comprises a set of instructions for providing a list of documents in an order based on a determined relevance of each respective result to the at least one name of an entity of interest.

26. The computer program product of claim 25, wherein the computer readable program code further comprises a set of instructions for assessing a similarity between a document selected from the list and other documents in the corpus based at least in part on the paired entities.

27. The computer program product of claim 26, wherein the computer readable program code further comprises a set of instructions for enabling a user to search through the other documents based on the assessed similarity by displaying a selectable database containing a subset of the other documents.

28. The computer program product of claim 27, wherein the selectable database is searchable according to named entity categories, such that when a user selects a named entity category, the computer readable program code further comprises a set of instructions for providing a list of named entities assigned to the selected category and contained in the selected document, such that the user is able to further narrow the search by selecting a particular named entity.

29. The computer program product of claim 28, wherein when the user selects a particular named entity, the computer readable program code further comprises a set of instructions for displaying at least one of the other documents which contains the selected named entity and an indicator of the assessed similarity between the selected document and the displayed at least one of the other documents.

30. The computer program product of claim 21, the computer readable program code further comprising a set of instructions for causing the user to be presented with names of associated entities based on the paired entities when typing a search request.

31. A computer-implemented method for searching through a corpus, the corpus comprising a plurality of documents, and the method comprising:
    analyzing, by a computer, the documents to identify semantic pairs in the documents, wherein each semantic pair comprises two named entities appearing together in an identifiable unit of a respective one of the documents;
    determining, by a computer, respective similarity scores between the documents based on the semantic pairs identified in each document; and
    responding, by a computer, to a user query containing at least one name of an entity of interest, the responding being based on the determined similarity scores,
    indicating, by a computer, at least one document responsive to the query and an indication of one or more responsive semantic pairs in the document, wherein a responsive semantic pair contains the at least one name of an entity of interest and at least one associated entity determined to be related to the at least one named entity of interest.

32. The computer-implemented method of claim 31, wherein the user query comprises an identification of one of the documents, and wherein responding comprises: determining a group of similar documents based on the determined similarity scores and transmitting an indication of the group of similar documents.

33. The computer-implemented method of claim 31, wherein the similarity score for two given documents is based on a document-distance metric constructed from those of the semantic pairs that appear in both of the two given documents.

* * * * *